(12) United States Patent
Ori et al.

(10) Patent No.: US 9,810,889 B2
(45) Date of Patent: Nov. 7, 2017

(54) ZOOM LENS AND IMAGING APPARATUS

(71) Applicant: FUJIFILM Corporation, Tokyo (JP)

(72) Inventors: Tetsuya Ori, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 304 days.

(21) Appl. No.: 14/635,195

(22) Filed: Mar. 2, 2015

(65) Prior Publication Data
US 2015/0177500 A1    Jun. 25, 2015

Related U.S. Application Data

(63) Continuation of application No. PCT/JP2013/004897, filed on Aug. 19, 2013.

(30) Foreign Application Priority Data

Sep. 5, 2012  (JP) .................. 2012-194735

(51) Int. Cl.
*G02B 27/64* (2006.01)
*G02B 15/14* (2006.01)
(Continued)

(52) U.S. Cl.
CPC ......... *G02B 15/163* (2013.01); *G02B 15/173* (2013.01); *G02B 15/20* (2013.01); *G02B 27/646* (2013.01)

(58) Field of Classification Search
CPC ........ G02B 15/00; G02B 15/14; G02B 15/15; G02B 15/16; G02B 15/167; G02B 15/173;
(Continued)

(56) References Cited

U.S. PATENT DOCUMENTS 5,000,549 A * 3/1991 Yamazaki ............ G02B 15/161
359/557
5,892,626 A    4/1999 Kohno
(Continued)

FOREIGN PATENT DOCUMENTS

CN    1755413     4/2006
JP    09-218352   8/1997
(Continued)

OTHER PUBLICATIONS

German Office Action dated Feb. 3, 2016; File No. 11 2013 004 361.0.
(Continued)

*Primary Examiner* — Thong Nguyen
(74) *Attorney, Agent, or Firm* — Young & Thompson

(57) ABSTRACT

A zoom lens consists of a first lens group having positive refractive power, a second lens group having negative refractive power, a third lens group having positive refractive power, a fourth lens group having positive refractive power, and a fifth lens group having positive refractive power in this order from an object side. The third lens group consists of a 3-1st lens group having positive refractive power and a 3-2nd lens group having negative refractive power in this order from the object side. A hand shake blur is corrected by moving the 3-2nd lens group in a direction perpendicular to optical axis. Magnification is changed by changing distances between the lens groups while the fifth lens group is fixed.

19 Claims, 11 Drawing Sheets

(51) Int. Cl.
*G02B 15/163* (2006.01)
*G02B 15/173* (2006.01)
*G02B 15/20* (2006.01)

(58) Field of Classification Search
CPC ...... G02B 15/177; G02B 15/20; G02B 15/22; G02B 27/64; G02B 27/646
See application file for complete search history.

(56) References Cited

U.S. PATENT DOCUMENTS

| | | | |
|---|---|---|---|
| 7,068,429 B1 | 6/2006 | Ori | |
| 7,180,680 B2* | 2/2007 | Park | G02B 15/173 359/676 |
| 7,251,081 B2 | 7/2007 | Sato | |
| 7,307,797 B2 | 12/2007 | Yoshitsugu et al. | |
| 7,626,766 B2 | 12/2009 | Yoshitsugu et al. | |
| 7,755,844 B2 | 7/2010 | Take | |
| 7,791,801 B2 | 9/2010 | Yoshitsugu et al. | |
| 8,054,549 B2 | 11/2011 | Toyoda | |
| 8,922,904 B2* | 12/2014 | Tanaka | G02B 15/173 359/683 |
| 2003/0117717 A1 | 6/2003 | Ohtake et al. | |
| 2009/0135485 A1* | 5/2009 | Ohtake | G02B 27/646 359/557 |
| 2009/0290216 A1* | 11/2009 | Fujisaki | G02B 15/173 359/557 |
| 2010/0046074 A1* | 2/2010 | Wada | G02B 15/173 359/557 |
| 2013/0050843 A1 | 2/2013 | Nakamura | |
| 2014/0368925 A1* | 12/2014 | Kawamura | G02B 27/646 359/687 |

FOREIGN PATENT DOCUMENTS

| | | |
|---|---|---|
| JP | 2003-177318 | 6/2003 |
| JP | 2006-106091 | 4/2006 |
| JP | 2006-195068 | 7/2006 |
| JP | 2007-017532 | 1/2007 |
| JP | 2007-212962 | 8/2007 |
| JP | 2007-212963 | 8/2007 |
| JP | 2009-047903 | 3/2009 |
| JP | 2009-086437 | 4/2009 |
| JP | 2009-169264 | 7/2009 |
| JP | 2010-185942 | 8/2010 |
| JP | 2013-037063 | 2/2013 |
| JP | 2013-044815 | 3/2013 |

OTHER PUBLICATIONS

International Search Report PCT/JP2013/004897 dated Dec. 24, 2013.

CN Office Action dated May 5, 2016; Application No. 201380045148.0.

* cited by examiner

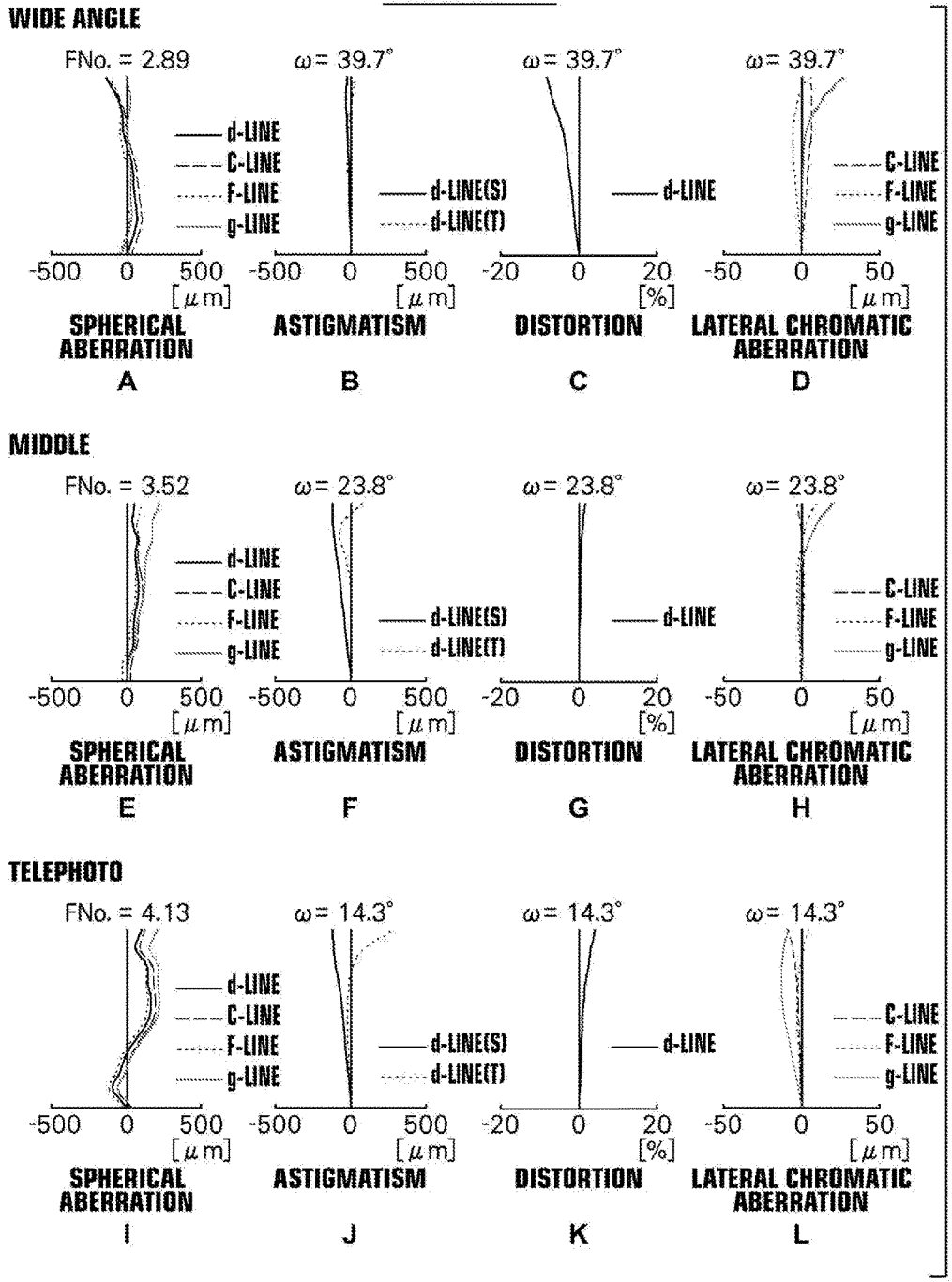

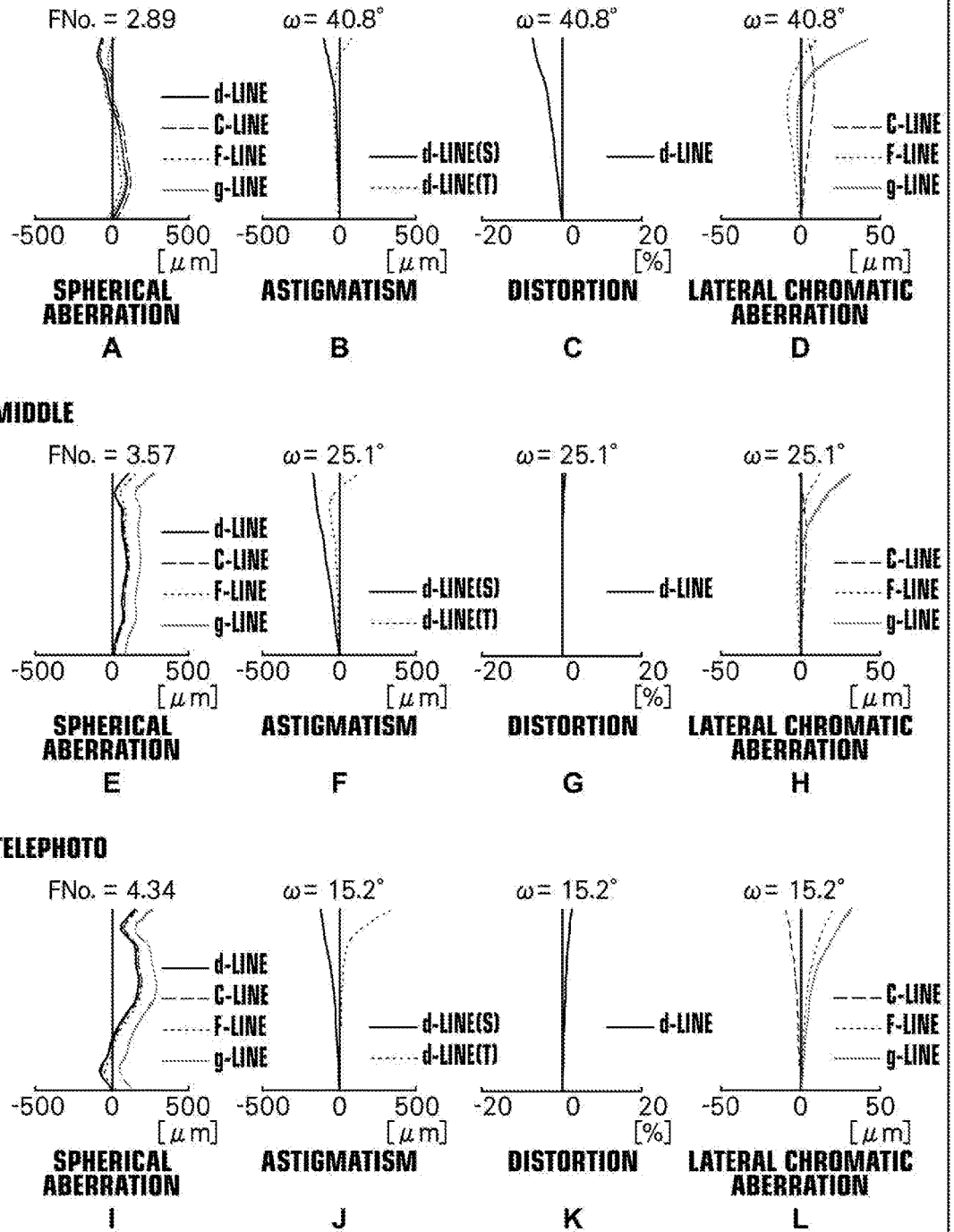

FIG.8 EXAMPLE 3
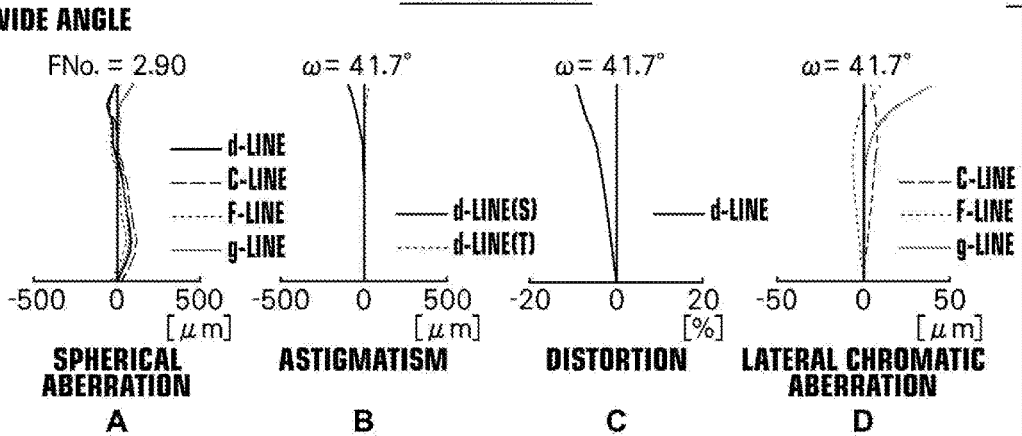
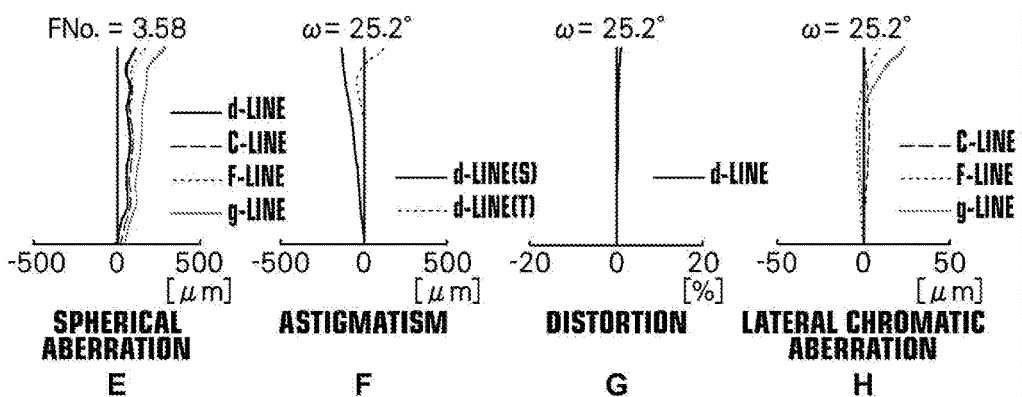
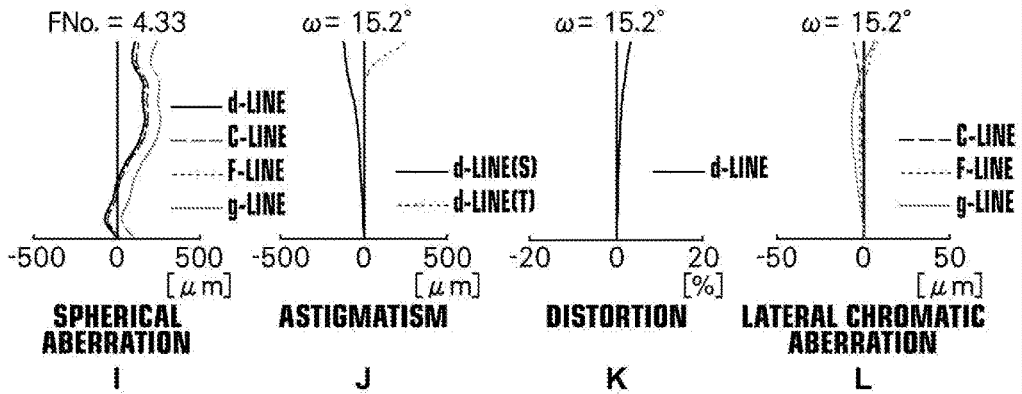

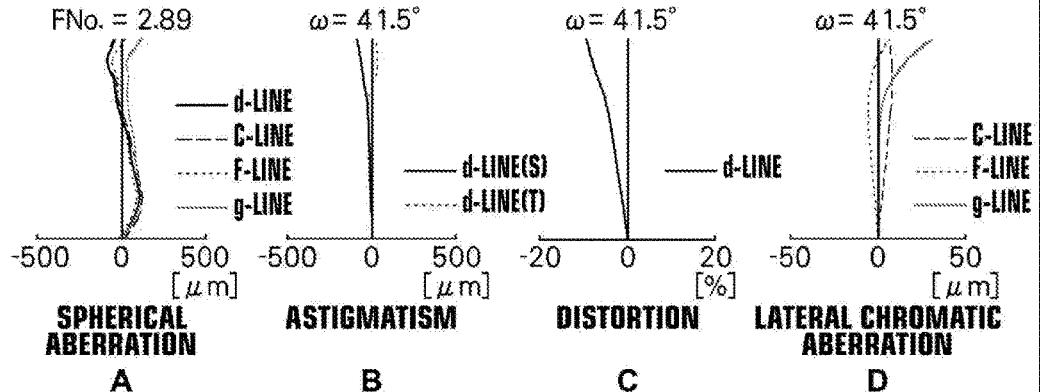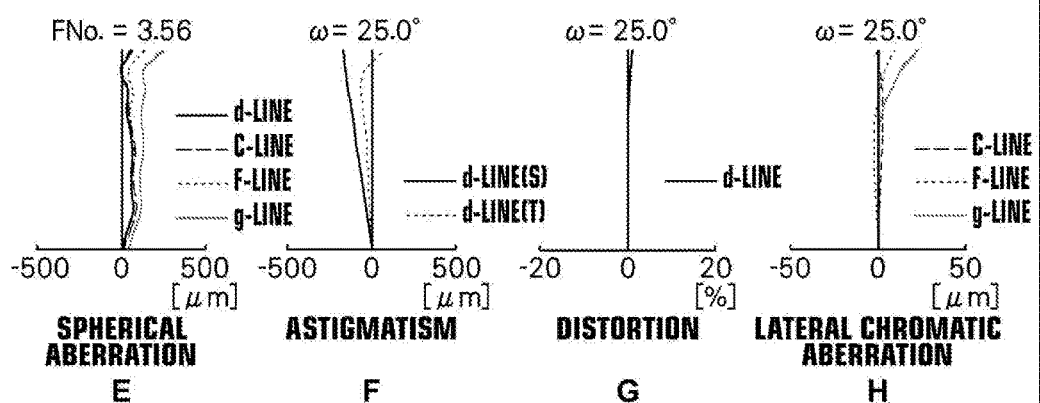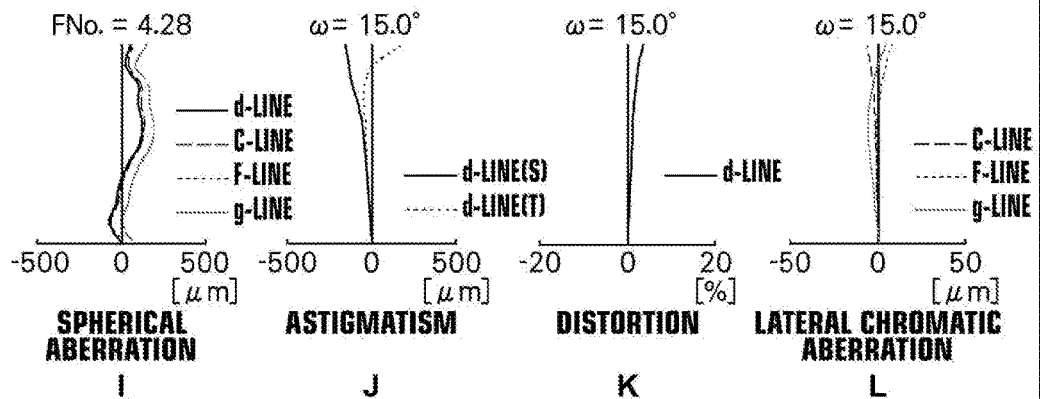
FIG.9 EXAMPLE 4

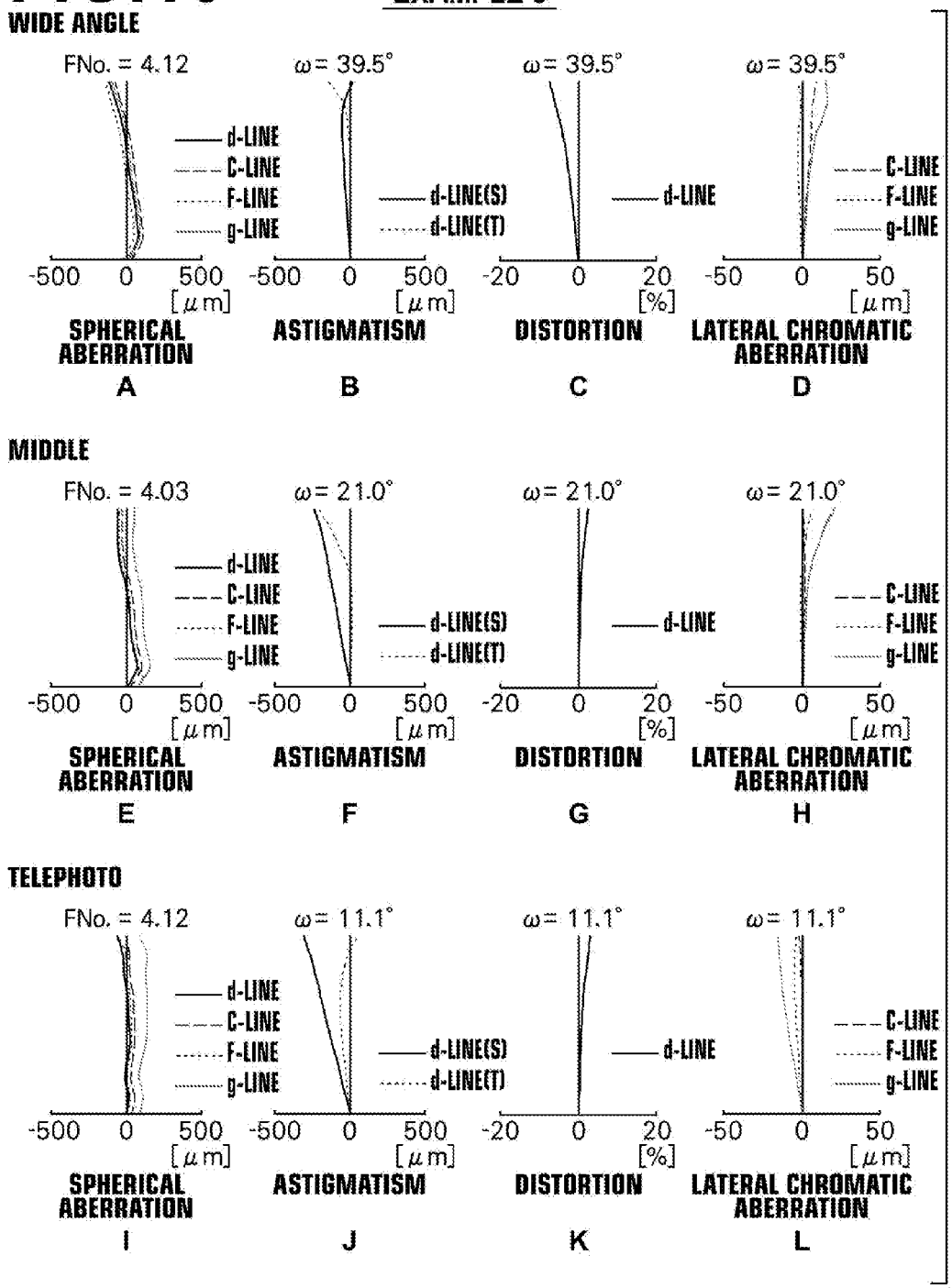

ZOOM LENS AND IMAGING APPARATUS

CROSS-REFERENCE TO RELATED APPLICATIONS

This application is a Continuation of PCT International Application No. PCT/JP2013/004897 filed on Aug. 19, 2013, which claims priority under 35 U.S.C. §119(a) to Japanese Patent Application No. 2012-194735 filed on Sep. 5, 2012. Each of the above applications is hereby expressly incorporated by reference, in its entirety, into the present application.

BACKGROUND OF THE INVENTION

Field of the Invention

The present invention relates to a zoom lens and an imaging apparatus. In particular, the present invention relates to a zoom lens used in an electronic camera, such as a digital camera, a camera for broadcasting, a camera for surveillance and a camera for film making, and also to an imaging apparatus including the zoom lens.

Description of the Related Art

A zoom lens used in an imaging apparatus, such as a video camera and an electronic still camera using imaging devices, such as a CCD (Charge Coupled Device) and a CMOS (Complementary Metal Oxide Semiconductor), as a recording medium, lenses are disclosed, for example, in Japanese Unexamined Patent Publication No. 9(1997)-218352 (Patent Document 1), Japanese Unexamined Patent Publication No. 2009-086437 (Patent Document 2), Japanese Unexamined Patent Publication No. 2010-185942 (Patent Document 3), and Japanese Unexamined Patent Publication No. 2007-017532 (Patent Document 4).

As high-definition digital cameras and high-definition cameras for film making became used in recent years, zoom lenses in which various aberrations are excellently corrected have become needed. Further, a request for a zoom lens with a small F-number FNo., which is a so-called bright zoom lens, has been increasing. Here, the request about FNo. is roughly classifiable into a request for a small FNo. at a wide angle end, a request for a small FNo. at a telephoto end, and a request for a constant FNo. with sufficient brightness from the wide angle end through the telephoto end. Further, when the zoom lens is used as a standard zoom lens, a full angle of view of about 70 degrees or greater at a wide angle end is requested. Recently, it is also desirable that the zoom lens has a hand shake blur correction function.

However, the zoom lens disclosed in Patent Document 1 has an FNo. of 4.6 through 7.2, which means the lens is not sufficiently bright. Meanwhile, the zoom lens disclosed in Example 7 of Patent Document 2 has an FNo. of 2.83 at a wide angle end, which means the lens is sufficiently bright. However, an FNo. at a telephoto end is 5.64, which is not sufficiently bright. Further, both of Patent Documents 1 and 2 are silent about hand shake blur correction.

In the zoom lens disclosed in Patent Document 3, hand shake blur correction is mentioned. Further, an FNo. at a wide angle end is 1.8 and an FNo. at a telephoto end is 3.5, which means the lens is sufficiently bright. However, a full angle of view at the wide angle end is 60 degrees, which means narrow. Therefore, the zoom lens is not appropriate for use as a standard zoom lens of a digital camera.

In the zoom lens disclosed in Patent Document 4, hand shake blur correction is also mentioned, and an FNo. at a wide angle end is 2.76, which is sufficiently bright. However, an FNo. at a telephoto end is 5.17, which is not sufficiently bright. Further, there is a problem that the total length of the lens is long, compared with the focal length at the wide angle end. Further, the refractive power of a lens group used to correct a hand shake blur is weak. Therefore, there is a problem that the movement amount of the lens group during hand shake blur correction is large.

SUMMARY OF THE INVENTION

In view of the foregoing circumstances, it is an object of the present invention to provide a zoom lens having a small FNo., in which various aberrations are excellently corrected, and the total length of which is short, and a full angle of view of which at a wide angle end is wide while the zoom lens has a hand shake blur correction function, and also an imaging apparatus including the lens.

A zoom lens of the present invention consists of a first lens group having positive refractive power, a second lens group having negative refractive power, a third lens group having positive refractive power, a fourth lens group having positive refractive power, and a fifth lens group having positive refractive power in this order from an object side. Further, the third lens group consists of a 3-1st lens group having positive refractive power and a 3-2nd lens group having negative refractive power in this order from the object side. A hand shake blur is corrected by moving the 3-2nd lens group in a direction perpendicular to an optical axis. Further, magnification is changed by changing distances between the lens groups while the fifth lens group is fixed.

In the zoom lens of the present invention, it is desirable that the 3-1st lens group consists of a positive lens, a negative lens and a positive lens in this order from the object side.

Further, it is desirable that the 3-2nd lens group consists of a cemented lens of a positive lens with its convex surface facing an image side and a negative lens cemented together in this order from the object side.

In this case, it is desirable that the 3-2nd lens group satisfies the following conditional expressions:

$$Np > Nn \quad (1); \text{ and}$$

$$\nu p < \nu n \quad (2), \text{ where}$$

Np: a refractive index of the positive lens constituting the 3-2nd lens group,

Nn: a refractive index of the negative lens constituting the 3-2nd lens group,

νp: an Abbe number of the positive lens constituting the 3-2nd lens group, and

νn: an Abbe number of the negative lens constituting the 3-2nd lens group.

It is desirable that the fourth lens group consists of a 4-1st lens group having positive refractive power and 4-2nd lens group having negative refractive power in this order from the object side, and that focusing is performed by moving the 4-2nd lens group in an optical axis direction.

In this case, it is desirable that the 4-2nd lens group includes a cemented lens of a negative lens with its concave surface facing an image side and a positive lens cemented together in this order from the object side.

It is desirable that a full angle of view at a wide angle end is greater than or equal to 70 degrees, and that the following conditional expressions are satisfied:

$$4.0 < f1/fw < 6.0 \quad (3); \text{ and}$$

$$1.1 < f1/ft < 2.2 \quad (4), \text{where}$$

f1: a focal length of the first lens group,
fw: a focal length of an entire system at the wide angle end, and
ft: a focal length of the entire system at a telephoto end.

It is desirable that a full angle of view at a wide angle end is greater than or equal to 70 degrees, and that the following conditional expressions are satisfied:

$$-3.0 < f3\text{-}2/fw < -1.0 \quad (5); \text{ and}$$

$$-1.2 < f3\text{-}2/ft < -0.3 \quad (6), \text{ where}$$

f3-2: a focal length of the 3-2nd lens group,
fw: a focal length of an entire system at a wide angle end, and
ft: a focal length of the entire system at a telephoto end.

It is desirable that a full angle of view at a wide angle end is greater than or equal to 70 degrees, and that the following conditional expressions are satisfied:

$$-3.0 < f4\text{-}2/fw < -1.0 \quad (7); \text{ and}$$

$$-1.2 < f4\text{-}2/ft < -0.3 \quad (8), \text{ where}$$

f4-2: a focal length of the 4-2nd lens group,
fw: a focal length of an entire system at a wide angle end, and
ft: a focal length of the entire system at a telephoto end.

It is desirable that the first lens group consists of a negative lens with its concave surface facing an image side and a positive lens with its convex surface facing the object side in this order from the object side, and that the following conditional expression is satisfied:

$$-3.0 < (R1f + R1r)/(R1f - R1r) < -1.1 \quad (9), \text{ where}$$

R1f: a curvature radius of an object-side surface of the negative lens in the first lens group, and
R1r: a curvature radius of an image-side surface of the positive lens in the first lens group.

Further, it is desirable that the negative lens and the positive lens in the first lens group are cemented together.

Further, it is desirable that a stop is provided toward an object side of the third lens group.

It is desirable that a full angle of view at a wide angle end is greater than or equal to 70 degrees, and that the following conditional expressions are satisfied:

$$4.2 < f1/fw < 5.8 \quad (3\text{-}1); \text{ and}$$

$$1.4 < f1/ft < 2.1 \quad (4\text{-}1).$$

Further, it is desirable that a full angle of view at a wide angle end is greater than or equal to 70 degrees, and that the following conditional expressions are satisfied:

$$-2.7 < f3\text{-}2/fw < -1.3 \quad (5\text{-}1); \text{ and}$$

$$-1.0 < f3\text{-}2/ft < -0.4 \quad (6\text{-}1).$$

Further, it is desirable that a full angle of view at a wide angle end is greater than or equal to 70 degrees, and that the following conditional expressions are satisfied:

$$-2.7 < f4\text{-}2/fw < -1.3 \quad (7\text{-}1); \text{ and}$$

$$-1.0 < f4\text{-}2/ft < -0.4 \quad (8\text{-}1).$$

Further, it is desirable that the first lens group consists of a negative lens with its concave surface facing an image side and a positive lens with its convex surface facing the object side in this order from the object side, and that the following conditional expression is satisfied:

$$-2.7 < (R1f + R1r)/(R1f - R1r) < -1.3 \quad (9\text{-}1).$$

An imaging apparatus of the present invention includes the aforementioned zoom lens of the present invention.

The zoom lens of the present invention consists of a first lens group having positive refractive power, a second lens group having negative refractive power, a third lens group having positive refractive power, a fourth lens group having positive refractive power, and a fifth lens group having positive refractive power in this order from an object side. Further, the third lens group consists of a 3-1st lens group having positive refractive power and a 3-2nd lens group having negative refractive power in this order from the object side. Further, a hand shake blur is corrected by moving the 3-2nd lens group in a direction perpendicular to an optical axis. Further, magnification is changed by changing distances between the lens groups while the fifth lens group is fixed. Therefore, it is possible to provide a zoom lens having a small FNo., and in which various aberrations are excellently corrected, and the total length of which is short, and a full angle of view of which at a wide angle end is wide while the zoom lens has a hand shake blur correction function.

The imaging apparatus of the present invention includes the zoom lens of the present invention. Therefore, it is possible to obtain bright high image-quality video images, and to reduce the size of the apparatus.

BRIEF DESCRIPTION OF THE DRAWINGS

FIG. 6 is aberration diagrams (Sections A through L) of the zoom lens in Example 1 of the present invention;

FIG. 7 is aberration diagrams (Sections A through L) of the zoom lens in Example 2 of the present invention;

FIG. 8 is aberration diagrams (Sections A through L) of the zoom lens in Example 3 of the present invention;

FIG. 9 is aberration diagrams (Sections A through L) of the zoom lens in Example 4 of the present invention;

FIG. 10 is aberration diagrams (Sections A through L) of the zoom lens in Example 5 of the present invention.

DESCRIPTION OF THE PREFERRED EMBODIMENTS

Figure 1:
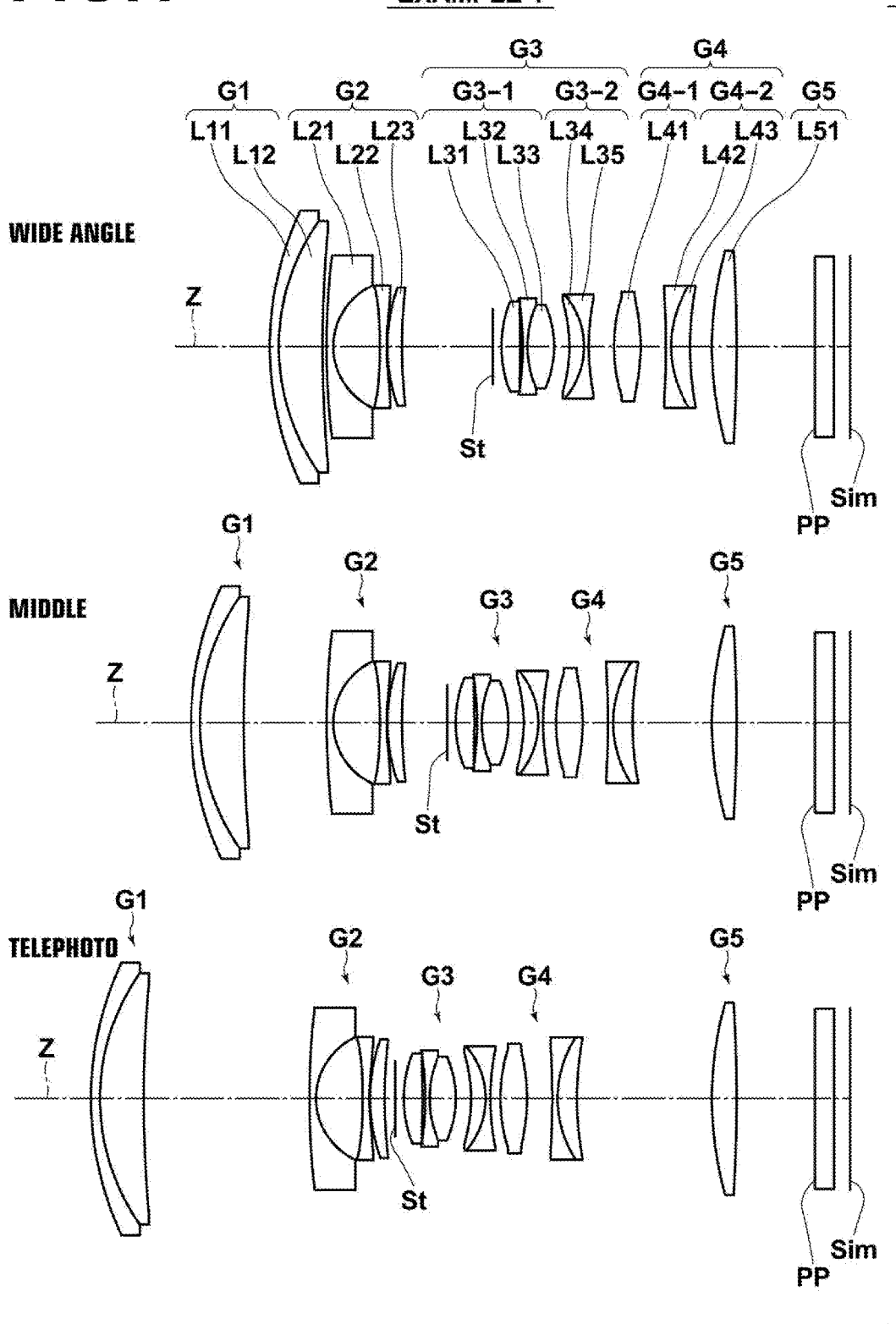
FIG. 1 is a cross section illustrating the lens configuration of a zoom lens according to an embodiment of the present invention (also Example 1)

Next, embodiments of the present invention will be described in detail with reference to drawings. FIG. 1 is a cross section illustrating the lens configuration of a zoom lens according to an embodiment of the present invention. The example of the configuration illustrated in FIG. 1 is also the configuration of a zoom lens in Example 1, which will be described later. In FIG. 1, a left side is an object side, and a right side is an image side.

This zoom lens consists of first lens group G1 having positive refractive power, second lens group G2 having negative refractive power, aperture stop St, third lens group G3 having positive refractive power, fourth lens group G4 having positive refractive power and fifth lens group G5 having positive refractive power along optical axis Z in this order from an object side. Further, magnification is changed by changing distances between the lens groups while fifth lens group G5 is fixed. When magnification is changed from a wide angle end to a telephoto end, a distance between first lens group G1 and second lens group G2 increases, and a distance between second lens group G2 and third lens group G3 decreases, and a distance between third lens group G3 and fourth lens group G4 changes, and a distance between fourth lens group G4 and fifth lens group G5 increases. Here, aperture stop St illustrated in FIG. 1 does not necessarily represent the size or the shape of the aperture stop, but the position of the aperture stop on optical axis Z.

When this zoom lens is applied to an imaging apparatus, it is desirable to arrange a cover glass, a prism, and various filters, such as an infrared-ray-cut filter and a low-pass filter, between an optical system and image plane Sim based on the configuration of a camera on which the lens is mounted. Therefore, FIG. 1 illustrates an example in which parallel-flat-plate-shaped optical member PP, which is assumed to be these elements, is arranged between fifth lens group G5 and image plane Sim.

Third lens group G3 consists of 3-1st lens group G3-1 having positive refractive power and 3-2nd lens group G3-2 having negative refractive power in this order from the object side. Further, a hand shake blur is corrected by moving 3-2nd lens group G3-2 in a direction perpendicular to optical axis Z.

As described above, the zoom lens consists of a positive lens group, a negative lens group, a positive lens group, a positive lens group and a positive lens group in this order from the object side. This configuration is advantageous to reducing FNo., because it is possible to distribute positive refractive after third lens group G3 to the lens groups.

Here, fifth lens group G5 does not have a movement mechanism, and is fixed. Therefore, when the zoom lens is used as an interchangeable lens, it is possible to prevent entrance of dust or unwanted particles into the zoom lens from the image side. Further, it is possible to prevent direct application of external force to a variable magnification mechanism and a focusing mechanism.

Meanwhile, when a hand shake blur is corrected by a lens close to an image plane, as in Patent Document 3, a movement amount of a lens group during hand shake blur correction tends to become large. When a hand shake blur is corrected by the whole third lens group, a fluctuation of aberrations during hand shake blur correction tends to become large, because the refractive power of the third lens group is generally strong. Further, as in Patent Document 4, when the third lens group is divided into two lens groups each having positive refractive power, and a hand shake blur is corrected by the object-side lens group, the refractive power of the lens group for correcting a hand shake blur is too weak, and a movement amount tends to become large.

Therefore, as in the embodiment of the present invention, when third lens group G3 consists of 3-1st lens group G3-1 having positive refractive power and 3-2nd lens group G3-2 having negative refractive power in this order from the object side, and a hand shake blur is corrected by moving 3-2nd lens group G3-2 in a direction perpendicular to optical axis Z, it is possible to reduce a movement amount of the lens group during hand shake blur correction. That is effective to reduce the size of the zoom lens, to save electric power, and to improve a hand shake blur correction response. Further, it is possible to reduce a fluctuation of aberrations during hand shake blur correction, compared with a case of moving the whole third lens group G3. Further, since 3-1st lens group G3-1 has positive refractive power, the width of rays entering 3-2nd lens group G3-2 becomes narrow. Therefore, a small lens diameter is sufficient as the diameter of a lens or lenses constituting 3-2nd lens group G3-2, and that is advantageous to reducing the weight of the lens group for correcting a hand shake blur.

In the zoom lens according to the embodiment of the present invention, it is desirable that 3-1st lens group G3-1 consists of a positive lens, a negative lens and a positive lens in this order from the object side.

Since divergent rays that have passed through second lens group G2 enter 3-1st lens group G3-1, 3-1st lens group G3-1 needs relatively strong refractive power. Especially, a load on this lens group increases to reduce FNo. Further, it is necessary that 3-1st lens group G3-1 consists of a small number of lenses to prevent an increase in the thickness of 3-1st lens group G3-1 on the optical axis.

Therefore, when 3-1st lens group G3-1 consists of three lenses of a positive lens, a negative lens and a positive lens in this order from the object side, it is possible to appropriately control various aberrations generated in this lens group while configuring the lens group by using a minimum number of lenses. Further, it is possible to reduce the amount of aberrations generated during hand shake blur correction by balancing aberrations with 3-2nd lens group G3-2.

Here, it is desirable that both surfaces of a positive lens closest to the object side in 3-1st lens group G3-1 are aspheric. Consequently, it is possible to more excellently balance aberrations with 3-2nd lens group G3-2.

Further, it is desirable that 3-2nd lens group G3-2 consists of a cemented lens of a positive lens with its convex surface facing an image side and a negative lens cemented together in this order from the object side.

The weight of a lens group used to correct a hand shake blur needs to be light. When 3-2nd lens group G3-2 is configured as described above, it is possible to suppress generation of aberrations in 3-2nd lens group G3-2 without increasing the weight of 3-2nd lens group G3-2. Therefore, it is possible to suppress generation of aberrations during hand shake blur correction.

In this case, it is desirable that 3-2nd lens group G3-2 satisfies the following conditional expressions (1) and (2). When conditional expression (1) is satisfied, it is possible to suppress a spherical aberration and curvature of field generated in 3-2nd lens group G3-2, and to suppress generation of aberrations during hand shake blur correction. When conditional expression (2) is satisfied, it is possible to suppress chromatic aberrations generated in 3-2nd lens group G3-2, and to suppress generation of chromatic aberrations during hand shake blur correction.

$$Np > Nn \quad (1); \text{ and}$$

$$\nu p < \nu n \quad (2), \text{ where}$$

Np: a refractive index of the positive lens constituting the 3-2nd lens group,

Nn: a refractive index of the negative lens constituting the 3-2nd lens group,

νp: an Abbe number of the positive lens constituting the 3-2nd lens group, and

νn: an Abbe number of the negative lens constituting the 3-2nd lens group.

Further, it is desirable that fourth lens group G4 consists of 4-1st lens group G4-1 having positive refractive power and 4-2nd lens group G4-2 having negative refractive power in this order from the object side, and that focusing is performed by moving 4-2nd lens group G4-2 in the direction of an optical axis. In this case, when focusing is performed from infinity toward close-up side, 4-2nd lens group G4-2 moves from the object side toward the image side. When fourth lens group G4 is configured in this manner, it is possible to suppress a movement amount during focusing. Further, at a telephoto end in which a movement amount during focusing tends to become large, extra space is present in a distance between 4th lens group G4 and fifth lens group G5 at the close-up side. Therefore, it is possible to shorten a close-up distance.

In this case, it is desirable that 4-2nd lens group G4-2 includes a cemented lens of a negative lens with its concave surface facing an image side and a positive lens cemented together in this order from the object side. When 4-2nd lens group G4-2 is configured in this manner, it is possible to reduce generation of aberrations in 4-2nd lens group G4-2, and to suppress a fluctuation of aberrations during focusing. Here, it is desirable that 4-2nd lens group G4-2 consists of this cemented lens alone to reduce the weight of the focusing lens group.

Further, it is desirable that a full angle of view at a wide angle end is greater than or equal to 70 degrees, and that the following conditional expressions (3) and (4) are satisfied. If the values are less than the lower limits of conditional expressions (3) and (4), the refractive power of first lens group G1 becomes too strong, and especially a spherical aberration at a telephoto end becomes worse. In contrast, if the values exceed the upper limits of conditional expressions (3) and (4), it becomes difficult to reduce the thickness of the zoom lens. Here, when the following conditional expressions (3-1) and (4-1) are satisfied, more excellent characteristics are achievable:

$$4.0 < f1/fw < 6.0 \quad (3);$$

$$1.1 < f1/ft < 2.2 \quad (4);$$

$$4.2 < f1/fw < 5.8 \quad (3\text{-}1); \text{ and}$$

$$1.4 < f1/ft < 2.1 \quad (4\text{-}1), \text{ where}$$

f1: a focal length of the first lens group,
fw: a focal length of an entire system at a wide angle end, and
ft: a focal length of the entire system at a telephoto end.

Further, it is desirable that a full angle of view at a wide angle end is greater than or equal to 70 degrees, and that the following conditional expressions (5) and (6) are satisfied. If the values are less than the lower limits of conditional expressions (5) and (6), the refractive power of 3-2nd lens group G3-2 becomes weak, and a movement amount of the lens group during hand shake blur correction becomes large. Therefore, it becomes difficult to reduce the size of the zoom lens, to save electric power, and to improve a hand shake blur correction response. In contrast, if the values exceed the upper limits of conditional expressions (5) and (6), a fluctuation of aberrations during hand shake blur correction becomes large. Here, when the following conditional expressions (5-1) and (6-1) are satisfied, more excellent characteristics are achievable:

$$-3.0 < f3\text{-}2/fw < -1.0 \quad (5);$$

$$-1.2 < f3\text{-}2/ft < -0.3 \quad (6);$$

$$-2.7 < f3\text{-}2/fw < -1.3 \quad (5\text{-}1); \text{ and}$$

$$-1.0 < f3\text{-}2/ft < -0.4 \quad (6\text{-}1), \text{ where}$$

f3-2: a focal length of the 3-2nd lens group,
fw: a focal length of an entire system at a wide angle end, and
ft: a focal length of the entire system at a telephoto end.

Further, it is desirable that a full angle of view at a wide angle end is greater than or equal to 70 degrees, and that the following conditional expressions (7) and (8) are satisfied. If the values are less than the lower limits of conditional expressions (7) and (8), a movement amount of the lens group during focusing becomes large. Therefore, it becomes difficult to reduce the size of the zoom lens, to save electric power, and to improve a focusing speed. In contrast, if the values exceed the upper limits of conditional expressions (7) and (8), a fluctuation of aberrations during focusing becomes large. Here, when the following conditional expressions (7-1) and (8-1) are satisfied, more excellent characteristics are achievable:

$$-3.0 < f4\text{-}2/fw < -1.0 \quad (7);$$

$$-1.2 < f4\text{-}2/ft < -0.3 \quad (8);$$

$$-2.7 < f4\text{-}2/fw < -1.3 \quad (7\text{-}1); \text{ and}$$

$$-1.0 < f4\text{-}2/ft < -0.4 \quad (8\text{-}1), \text{ where}$$

f4-2: a focal length of the 4-2nd lens group,
fw: a focal length of an entire system at a wide angle end, and
ft: a focal length of the entire system at a telephoto end.

Further, it is desirable that first lens group G1 consists of a negative lens with its concave surface facing an image side and a positive lens with its convex surface facing the object side in this order from the object side, and that the following conditional expression (9) is satisfied. When the value is less than the lower limit of conditional expression (9), correction of chromatic aberrations becomes difficult. In contrast, if the value exceeds the upper limit of conditional expression (9), especially a spherical aberration at a telephoto end becomes worse. Here, when the following conditional expression (9-1) is satisfied, more excellent characteristics are achievable:

$$-3.0 < (R1f + R1r)/(R1f - R1r) < -1.1 \quad (9); \text{ and}$$

$$-2.7 < (R1f + R1r)/(R1f - R1r) < -1.3 \quad (9\text{-}1), \text{ where}$$

R1f: a curvature radius of an object-side surface of the negative lens in the first lens group, and
R1r: a curvature radius of an image-side surface of the positive lens in the first lens group.

In this case, it is desirable that the negative lens and the positive lens in first lens group G1 are cemented together. Consequently, it is possible to lower the intensity of a ghost image that tends to be generated on a boundary surface.

Further, it is desirable that a stop is provided toward the object side of third lens group G3. Consequently, it is possible to prevent interference between a stop mechanism and a hand shake blur correction mechanism.

Specifically, in the zoom lens of the present invention, it is desirable to use glass, as a material arranged closest to the object side. Alternatively, transparent ceramic may be used.

When the zoom lens of the present invention is used in tough conditions, it is desirable that a multi-layer coating for protection is applied to the zoom lens. Further, an anti-reflection coating for reducing ghost light during use or the like may be applied to the zoom lens in addition to the coating for protection.

FIG. 1 illustrates an example in which optical member PP is arranged between the lens system and image plane Sim.

Instead of arranging various filters, such as a low-pass filter and a filter that cuts a specific wavelength band, and the like between the lens system and image plane Sim, the various filters may be arranged between lenses. Alternatively, a coating having a similar action to the various filters may be applied to a lens surface of one of the lenses.

Next, numerical value examples of the zoom lens of the present invention will be described.

First, the zoom lens in Example 1 will be described. FIG. 1 is a cross section illustrating the lens configuration of the zoom lens in Example 1. In FIG. 1 and FIGS. 2 through 5 corresponding to Examples 2 through 5, which will be described later, optical member PP is also illustrated, and the left side is an object side, and the right side is an image side. Illustrated aperture stop St does not necessarily represent the size or the shape of the aperture stop, but the position of the aperture stop on optical axis Z.

In the zoom lens of Example 1, importance is given to FNo. at a wide angle end and reduction in size. Each of first lens group G1, 3-2nd lens group G3-2 and 4-2nd lens group G4-2 consists of a cemented lens of a positive lens and a negative lens.

Table 1 shows basic lens data of the zoom lens in Example 1. Table 2 shows data about the specification of the zoom lens in Example 1. Table 3 shows data about moving surface distances. Table 4 shows data about aspheric surface coefficients. In the following descriptions, the meanings of signs in the tables will be described by using the tables of Example 1, as an example. The meanings of signs in the tables of Examples 2 through 5 are basically similar to those of Example 1.

In the lens data of Table 1, a column of Si shows the surface number of an i-th surface (i=1, 2, 3 . . . ) when a surface of composition elements closest to the object side is the first surface and the surface numbers sequentially increase toward the image side. A column of Ri shows the curvature radius of the i-th surface. A column of Di shows a distance, on optical axis Z, between the i-th surface and (i+1)th surface. Further, a column of Ndj shows the refractive index of a j-th optical element (j=1, 2, 3 . . . ) for d-line (wavelength is 587.6 nm) when an optical element closest to the object side is the first optical element and j sequentially increases toward the image side. A column of vdj similarly shows the Abbe number of the j-th optical element for d-line (wavelength is 587.6 nm).

Here, the sign of a curvature radius is positive when a surface shape is convex toward the object side, and negative when a surface shape is convex toward the image side. The basic lens data show data including aperture stop St and optical member PP. In the column of surface numbers, the term "(STOP)" is written together with the surface number of a surface corresponding to aperture stop St.

Further, in the lens data of Table 1, "DD[i]" is written in a row of a surface distance that changes during magnification change.

Data about specification in Table 2 show values of a zoom ratio, focal length f', F-number FNo. and full angle of view 2ω for each of wide angle, middle and telephoto.

In the basic lens data, data about specification and data about moving surface distances, degree is used as the unit of an angle, and mm is used as the unit of a length. However, since an optical system is usable by proportionally enlarging the optical system or by proportionally reducing the optical system, other appropriate units may be used.

In the lens data of Table 1, mark "*" is attached to the surface numbers of aspheric surfaces. Further, a numerical value of a paraxial curvature radius is used as the curvature radius of an aspheric surface. The data about aspheric surface coefficients in Table 4 show surface numbers Si of aspheric surfaces and aspheric surface coefficients about the aspheric surfaces. The aspheric surface coefficients are values of coefficients KA, Am (m=3, 4, 5, . . . 20) in an aspheric surface equation represented by the following equation (A):

$$Zd = C \cdot h^2 / \{1 + (1 - KA \cdot C^2 \cdot h^2)^{1/2}\} + \Sigma Am \cdot h^m \quad (A),\text{ where}$$

Zd: the depth of an aspheric surface (the length of a perpendicular from a point on the aspheric surface at height h to a flat plane that contacts with the vertex of the aspheric surface and is perpendicular to the optical axis), h: height (a length from the optical axis), C: a reciprocal of a paraxial curvature radius, and KA, Am: aspheric surface coefficients (m=3, 4, 5, . . . 20).

TABLE 1

EXAMPLE 1—LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 51.5416 | 1.35 | 1.92286 | 18.90 |
| 2 | 35.0700 | 6.59 | 1.83481 | 42.73 |
| 3 | 209.5025 | DD[3] | | |
| 4 | 125.0732 | 1.00 | 1.62041 | 60.29 |
| 5 | 10.6516 | 7.00 | | |
| *6 | −135.8461 | 1.05 | 1.69098 | 52.95 |
| *7 | 35.9134 | 0.10 | | |
| 8 | 28.4414 | 2.20 | 1.92286 | 18.90 |
| 9 | 82.7316 | DD[9] | | |
| 10(STOP) | ∞ | 1.30 | | |
| *11 | 20.0172 | 2.80 | 1.80348 | 40.44 |
| *12 | −112.9886 | 0.41 | | |
| 13 | −46.0437 | 0.70 | 1.67270 | 32.10 |
| 14 | 16.7820 | 4.01 | 1.49700 | 81.54 |
| 15 | −16.7820 | 2.30 | | |
| 16 | −25.3157 | 2.20 | 1.88300 | 40.76 |
| 17 | −12.6840 | 0.71 | 1.63930 | 44.87 |
| 18 | 37.9929 | DD[18] | | |
| *19 | 26.9327 | 4.00 | 1.69098 | 52.95 |
| *20 | −29.4415 | 3.80 | | |
| 21 | −143.2379 | 0.80 | 1.83400 | 37.16 |
| 22 | 17.9890 | 2.92 | 1.48749 | 70.23 |
| 23 | 52.4550 | DD[23] | | |
| 24 | 56.9749 | 3.70 | 1.76200 | 40.10 |
| 25 | −260.0272 | 11.83 | | |
| 26 | ∞ | 2.85 | 1.51680 | 64.20 |
| 27 | ∞ | 2.42 | | |

TABLE 2

EXAMPLE 1—SPECIFICATION (d-LINE)

| | WIDE ANGLE | MIDDLE | TELEPHOTO |
|---|---|---|---|
| ZOOM RATIO | 1.0 | 1.7 | 2.9 |
| f | 18.56 | 31.50 | 53.46 |
| FNo. | 2.89 | 3.52 | 4.13 |
| 2ω[°] | 79.4 | 47.6 | 28.6 |

TABLE 3

EXAMPLE 1—ZOOM DISTANCE

| | WIDE ANGLE | MIDDLE | TELEPHOTO |
|---|---|---|---|
| DD[3] | 0.60 | 12.50 | 25.01 |
| DD[9] | 13.80 | 6.91 | 1.58 |
| DD[18] | 3.82 | 1.98 | 1.52 |
| DD[23] | 3.30 | 12.03 | 20.41 |

TABLE 4

EXAMPLE 1—ASPHERIC SURFACE COEFFICIENT

| SURFACE NUMBER | 6 | 7 | 11 |
|---|---|---|---|
| KA | 1.0000000E+00 | 1.0000000E+00 | 1.0000000E+00 |
| A3 | 2.8680435E−04 | 1.4710535E−05 | 7.3438711E−05 |
| A4 | −3.9606900E−04 | −2.5234353E−04 | −9.4826486E−05 |
| A5 | 9.6790033E−05 | 4.6561754E−05 | 4.8179429E−05 |
| A6 | −1.0299938E−05 | −1.8863447E−06 | −8.0733758E−06 |
| A7 | −4.7183893E−08 | −6.6117816E−07 | −1.8747216E−06 |
| A8 | 4.8830620E−08 | 8.2982647E−09 | 9.2289795E−07 |
| A9 | 2.8165954E−09 | 8.5750395E−09 | −1.0322294E−07 |
| A10 | −7.8456146E−11 | 6.6105996E−10 | 2.4327727E−09 |
| A11 | −1.9153122E−11 | −2.5092683E−11 | −9.9236793E−10 |
| A12 | −1.6490387E−12 | −1.1264706E−11 | 1.2442535E−11 |
| A13 | −2.8876807E−14 | −1.2106212E−12 | 3.1439069E−11 |
| A14 | −3.1702830E−15 | −1.1330751E−14 | 3.7267059E−12 |
| A15 | −7.1431744E−16 | 1.2237835E−14 | −3.3950388E−13 |
| A16 | −4.2397046E−17 | 1.9833659E−15 | −7.3787814E−14 |
| A17 | −1.1404544E−17 | 9.1340677E−17 | −1.5506159E−14 |
| A18 | 5.7084738E−18 | −1.8548064E−17 | 1.7800306E−16 |
| A19 | 5.4911330E−19 | −3.0052754E−18 | 6.1454204E−16 |
| A20 | −7.6120916E−20 | 2.3872349E−19 | −4.1314580E−17 |

| SURFACE NUMBER | 12 | 19 | 20 |
|---|---|---|---|
| KA | 1.0000000E+00 | 1.0000000E+00 | 1.0000000E+00 |
| A3 | 1.5350520E−04 | 1.2573913E−04 | 1.1028933E−04 |
| A4 | −1.1234510E−05 | −1.3483498E−04 | −4.2533206E−05 |
| A5 | −2.7955827E−05 | 4.5494707E−05 | 1.8296780E−05 |
| A6 | 2.5344483E−05 | −7.5505829E−06 | −4.0469416E−06 |
| A7 | −5.7895894E−06 | 5.5708415E−07 | 1.1053299E−06 |
| A8 | 2.7149949E−07 | −7.0799306E−08 | −1.8753429E−07 |
| A9 | −7.7087474E−09 | 2.4324572E−08 | 7.5019091E−09 |
| A10 | 1.9673684E−08 | −2.5318801E−09 | 7.7102039E−10 |
| A11 | −3.2960969E−10 | 3.1163560E−11 | 3.0528520E−10 |
| A12 | −4.9795800E−10 | −2.5903722E−11 | −4.8459994E−11 |
| A13 | −7.1976033E−11 | 5.8337715E−12 | −2.5038094E−12 |
| A14 | 7.4278993E−12 | −9.3756335E−14 | −2.2579873E−13 |
| A15 | 6.0588979E−12 | −3.8335644E−14 | 1.8387367E−13 |
| A16 | −8.0903072E−13 | 2.2295140E−15 | −1.3190284E−14 |
| A17 | −1.5774630E−14 | 2.0027372E−17 | −8.0764066E−17 |
| A18 | −1.1585061E−15 | −1.9289346E−18 | 6.5915836E−18 |
| A19 | 1.3703794E−15 | −9.9096954E−19 | 1.4602602E−18 |
| A20 | −8.5615323E−17 | 6.9998913E−20 | −3.2280458E−20 |

FIG. 6, Sections A through L are aberration diagrams of the zoom lens in Example 1. FIG. 6, Sections A through D illustrate a spherical aberration, astigmatism, distortion and a lateral chromatic aberration at wide angle, respectively. FIG. 6, Sections E through H illustrate a spherical aberration, astigmatism, distortion and a lateral chromatic aberration at middle, respectively. FIG. 6, Sections I through L illustrate a spherical aberration, astigmatism, distortion and a lateral chromatic aberration at telephoto, respectively.

Aberration diagrams of a spherical aberration, astigmatism and distortion show aberrations when d-line (wavelength is 587.6 nm) is a reference wavelength. In the aberration diagram of the spherical aberration, aberrations for d-line (wavelength is 587.6 nm), C-line (wavelength is 656.3 nm), F-line (wavelength is 486.1 nm) and g-line (wavelength is 435.8 nm) are indicated by a solid line, a long broken line, a short broken line and a gray solid line, respectively. In the aberration diagram of the astigmatism, an aberration in a sagittal direction and an aberration in a tangential direction are indicated by a solid line and a broken line, respectively. In the aberration diagram of the lateral chromatic aberration, an aberration for C-line (wavelength is 656.3 nm), an aberration for F-line (wavelength is 486.1 nm) and an aberration for g-line (wavelength is 435.8 nm) are indicated by a long broken line, a short broken line and a gray solid line, respectively. In the aberration diagram of the spherical aberration, FNo. represents an F-number. In the other aberration diagrams, ω means a half angle of view.

Figure 2:
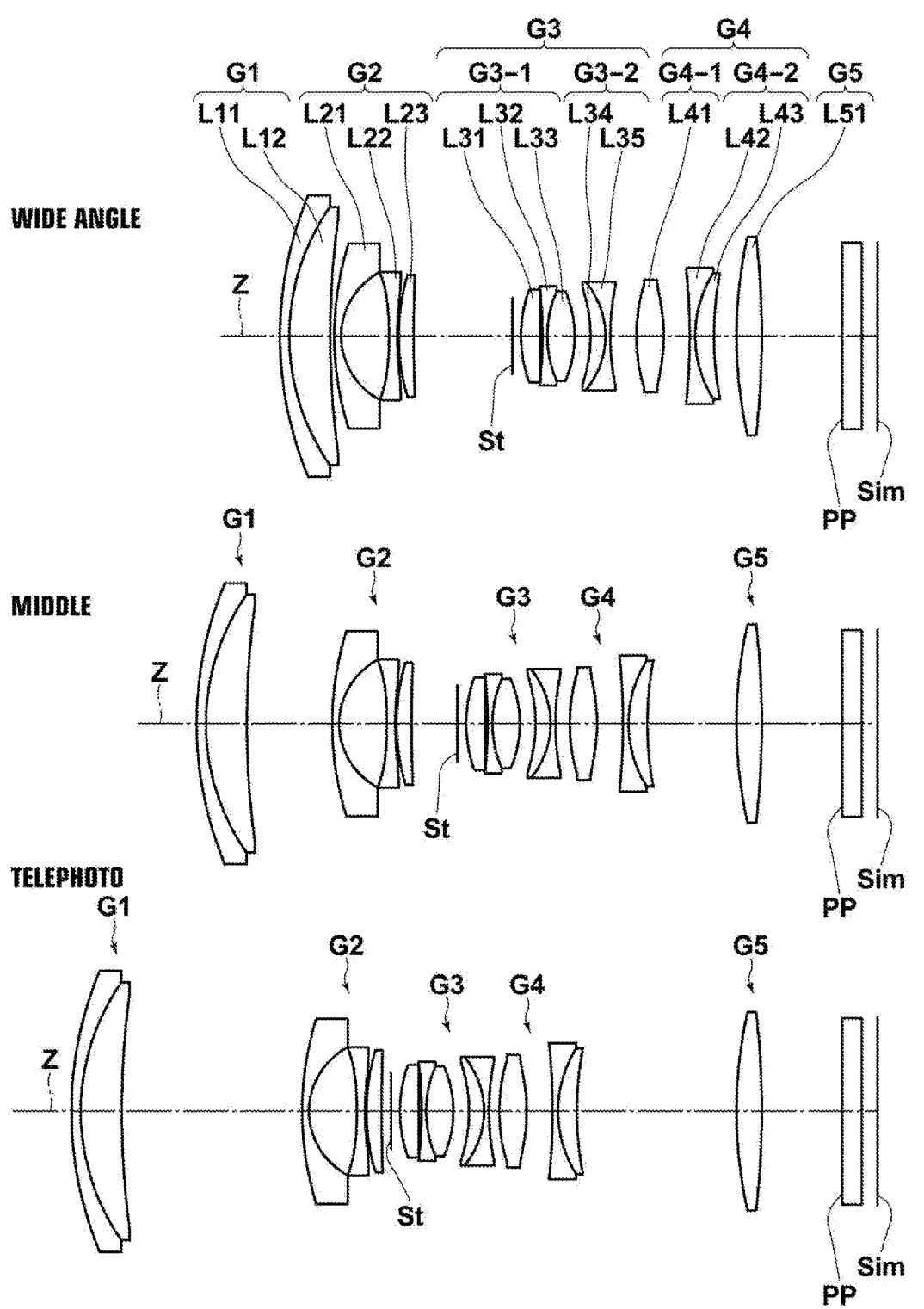
FIG. 2 is a cross section illustrating the lens configuration of a zoom lens in Example 2 of the present invention.

Next, a zoom lens in Example 2 will be described. FIG. 2 is a cross section illustrating the lens configuration of the zoom lens in Example 2.

The shape of the zoom lens in Example 2 is similar to that of the zoom lens in Example 1.

Table 5 shows basic lens data of the zoom lens in Example 2. Table 6 shows data about the specification of the zoom lens in Example 2. Table 7 shows data about moving surface distances. Table 8 shows data about aspheric surface coefficients. FIG. 7, Sections A through L illustrate aberration diagrams.

TABLE 5

EXAMPLE 2—LENS DATA

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 1 | 56.8952 | 1.36 | 1.84666 | 23.78 |
| 2 | 34.9997 | 6.00 | 1.88300 | 40.76 |
| 3 | 138.2593 | DD[3] | | |

TABLE 5-continued

EXAMPLE 2—LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 4 | 48.2920 | 1.00 | 1.75500 | 52.32 |
| 5 | 11.1007 | 7.00 | | |
| *6 | −76.6140 | 1.21 | 1.62263 | 58.16 |
| *7 | 33.5305 | 0.21 | | |
| 8 | 33.4180 | 2.20 | 1.92286 | 20.88 |
| 9 | 262.4996 | DD[9] | | |
| 10(STOP) | ∞ | 1.30 | | |
| *11 | 20.8021 | 2.80 | 1.80610 | 40.73 |
| *12 | −245.8073 | 0.35 | | |
| 13 | −65.9959 | 0.70 | 1.67270 | 32.10 |
| 14 | 17.3921 | 4.01 | 1.49700 | 81.54 |
| 15 | −17.3921 | 2.30 | | |
| 16 | −23.7268 | 2.20 | 1.90366 | 31.32 |
| 17 | −13.0956 | 0.71 | 1.60342 | 38.03 |
| 18 | 38.0005 | DD[18] | | |
| *19 | 27.8897 | 4.00 | 1.69350 | 53.20 |
| *20 | −27.0941 | 3.80 | | |
| 21 | −102.4322 | 0.80 | 1.85026 | 32.27 |
| 22 | 18.3339 | 2.76 | 1.51823 | 58.90 |
| 23 | 52.5015 | DD[23] | | |
| 24 | 70.3669 | 3.70 | 1.75520 | 27.51 |
| 25 | −137.0292 | 11.77 | | |
| 26 | ∞ | 2.85 | 1.51680 | 64.20 |
| 27 | ∞ | 2.31 | | |

TABLE 6

EXAMPLE 2—SPECIFICATION (d-LINE)

| | WIDE ANGLE | MIDDLE | TELEPHOTO |
|---|---|---|---|
| ZOOM RATIO | 1.0 | 1.7 | 2.9 |
| f | 17.67 | 30.00 | 50.91 |
| FNo. | 2.89 | 3.57 | 4.34 |
| 2ω[°] | 81.6 | 50.2 | 30.4 |

TABLE 7

EXAMPLE 2—ZOOM DISTANCE

| | WIDE ANGLE | MIDDLE | TELEPHOTO |
|---|---|---|---|
| DD[3] | 0.60 | 12.50 | 26.42 |
| DD[9] | 14.45 | 6.73 | 1.39 |
| DD[18] | 3.83 | 2.10 | 1.53 |
| DD[23] | 3.30 | 13.06 | 23.37 |

TABLE 8

EXAMPLE 2—ASPHERIC SURFACE COEFFICIENT

| SURFACE NUMBER | 6 | 7 | 11 |
|---|---|---|---|
| KA | 1.0000000E+00 | 1.0000000E+00 | 1.0000000E+00 |
| A3 | 3.1209698E−04 | −3.0186656E−05 | 6.9448914E−05 |
| A4 | −4.6940536E−04 | −2.9760618E−04 | −9.9680354E−05 |
| A5 | 9.9178978E−05 | 4.6201075E−05 | 4.7999550E−05 |
| A6 | −9.2490073E−06 | −1.3463410E−06 | −7.4772477E−06 |
| A7 | −1.0800706E−07 | −6.0278728E−07 | −1.9848060E−06 |
| A8 | 4.0985105E−08 | 4.5811363E−09 | 8.8879727E−07 |
| A9 | 2.8252612E−09 | 7.4720397E−09 | −9.8765654E−08 |
| A10 | −3.1958806E−11 | 5.7903094E−10 | 3.5023912E−09 |
| A11 | −1.5065868E−11 | −1.8532210E−11 | −9.8501302E−10 |
| A12 | −1.6675742E−12 | −9.4180486E−12 | −3.1131419E−12 |
| A13 | −6.2441073E−14 | −1.0567126E−12 | 2.4900325E−11 |
| A14 | −3.9399541E−15 | −1.2568924E−14 | 3.5380198E−12 |
| A15 | −3.8066176E−16 | 9.9189344E−15 | −2.5044904E−13 |
| A16 | 1.3843763E−17 | 1.6916768E−15 | −5.0462625E−14 |
| A17 | −1.0673607E−17 | 8.2930896E−17 | −1.1694978E−14 |
| A18 | 4.7120238E−18 | −1.5311859E−17 | −4.3852946E−16 |
| A19 | 4.1399422E−19 | −2.4938147E−18 | 4.5807825E−16 |
| A20 | −6.0649421E−20 | 1.9236998E−19 | −2.4150453E−17 |

| SURFACE NUMBER | 12 | 19 | 20 |
|---|---|---|---|
| KA | 1.0000000E+00 | 1.0000000E+00 | 1.0000000E+00 |
| A3 | 1.7482541E−04 | 1.0391979E−04 | 8.6515925E−05 |
| A4 | −2.5384320E−05 | −1.2203179E−04 | −2.6511670E−05 |
| A5 | −2.9414438E−05 | 4.2025280E−05 | 1.3788085E−05 |
| A6 | 2.7157195E−05 | −7.0519796E−06 | −3.2448478E−06 |
| A7 | −6.0821019E−06 | 5.7449479E−07 | 1.0458471E−06 |
| A8 | 2.2859211E−07 | −7.7607777E−08 | −1.8539190E−07 |
| A9 | −1.7457516E−09 | 2.4346968E−08 | 7.6845268E−09 |
| A10 | 2.1243644E−08 | −2.5143428E−09 | 7.0662041E−10 |
| A11 | −3.8251259E−10 | 3.1897219E−11 | 3.0988674E−10 |
| A12 | −5.1671466E−10 | −2.5484180E−11 | −4.8593655E−11 |
| A13 | −7.7813389E−11 | 5.8414113E−12 | −2.5083728E−12 |
| A14 | 7.4423410E−12 | −9.3639335E−14 | −2.2276872E−13 |
| A15 | 6.1476856E−12 | −3.9077267E−14 | 1.8416565E−13 |
| A16 | −8.0024188E−13 | 2.1837550E−15 | −1.3141527E−14 |
| A17 | −1.2819270E−14 | 1.6122368E−17 | −8.3988939E−17 |

TABLE 8-continued

EXAMPLE 2—ASPHERIC SURFACE COEFFICIENT

| | | | |
|---|---|---|---|
| A18 | −1.4374357E−15 | −6.6941192E−19 | 5.2053693E−18 |
| A19 | 1.2717259E−15 | −8.8299736E−19 | 1.2975583E−18 |
| A20 | −7.7197940E−17 | 5.9204723E−20 | −4.6653616E−21 |

Figure 3:
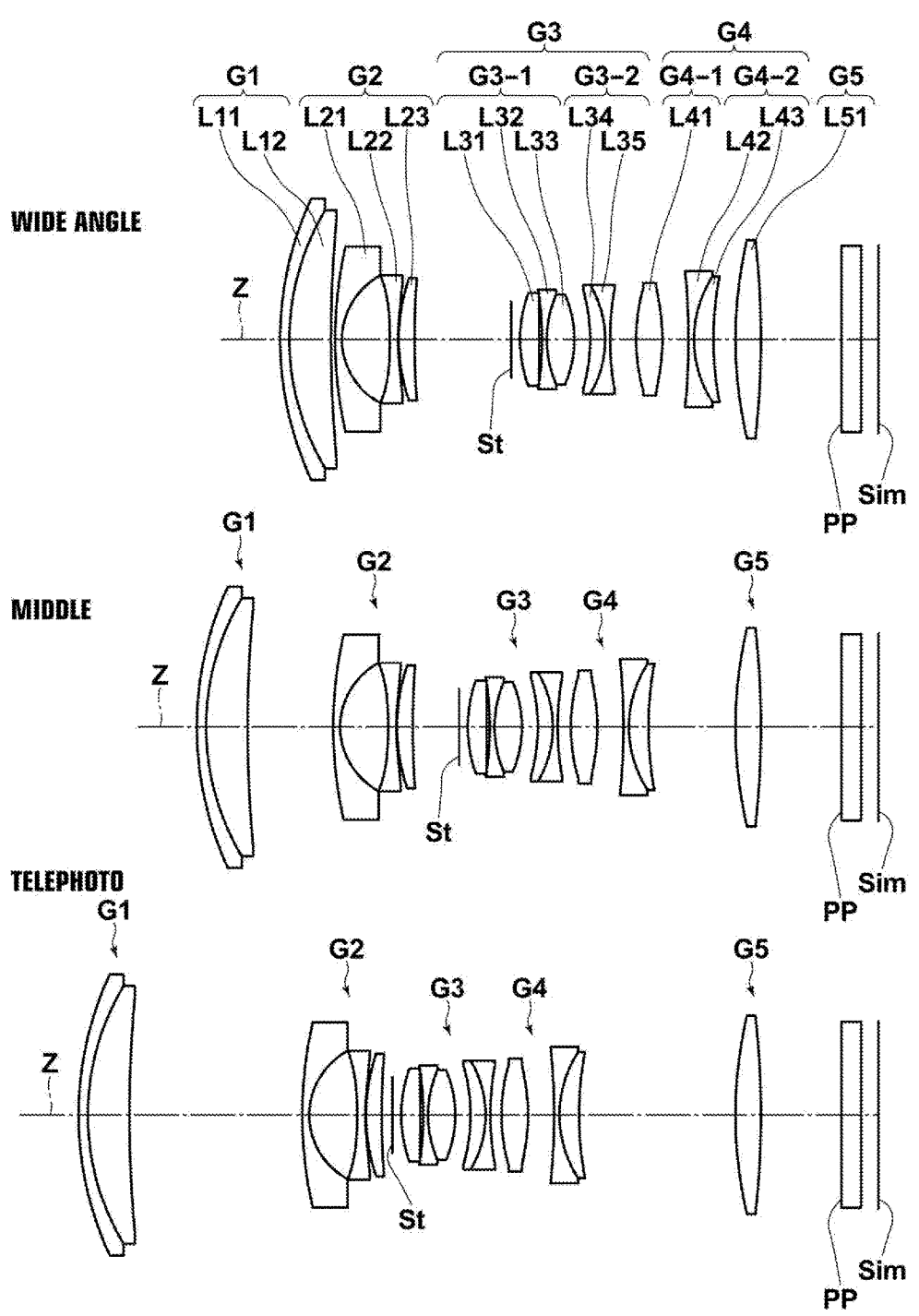
FIG. 3 is a cross section illustrating the lens configuration of a zoom lens in Example 3 of the present invention.

Next, a zoom lens in Example 3 will be described. FIG. 3 is a cross section illustrating the lens configuration of the zoom lens in Example 3.

The shape of the zoom lens in Example 3 is also similar to that of the zoom lens in Example 1.

Table 9 shows basic lens data of the zoom lens in Example 3. Table 10 shows data about the specification of the zoom lens in Example 3. Table 11 shows data about moving surface distances. Table 12 shows data about aspheric surface coefficients. FIG. 8, Sections A through L illustrate aberration diagrams.

TABLE 9

EXAMPLE 3—LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 52.0223 | 1.35 | 1.92286 | 18.90 |
| 2 | 39.0721 | 6.07 | 1.78800 | 47.37 |
| 3 | 204.5322 | DD[3] | | |
| 4 | 65.2302 | 1.00 | 1.72916 | 54.68 |
| 5 | 11.1532 | 7.00 | | |
| *6 | −70.3404 | 1.19 | 1.58313 | 59.38 |
| *7 | 31.2545 | 0.10 | | |
| 8 | 29.4377 | 2.30 | 1.92286 | 20.88 |
| 9 | 132.1819 | DD[9] | | |
| 10(STOP) | ∞ | 1.30 | | |
| *11 | 20.9666 | 2.80 | 1.80610 | 40.73 |
| *12 | −164.4536 | 0.41 | | |
| 13 | −49.0804 | 0.70 | 1.68893 | 31.07 |
| 14 | 17.4917 | 4.01 | 1.49700 | 81.54 |
| 15 | −17.4917 | 2.30 | | |
| 16 | −28.0681 | 2.20 | 2.00100 | 29.13 |
| 17 | −16.6319 | 0.71 | 1.58144 | 40.75 |
| 18 | 43.8333 | DD[18] | | |
| *19 | 29.6387 | 3.85 | 1.69350 | 53.20 |
| *20 | −28.9486 | 3.80 | | |
| 21 | −105.6997 | 0.80 | 1.85026 | 32.27 |
| 22 | 18.0034 | 2.85 | 1.51823 | 58.90 |
| 23 | 52.5001 | DD[23] | | |
| 24 | 68.4813 | 3.70 | 1.74950 | 35.28 |
| 25 | −142.4240 | 11.77 | | |
| 26 | ∞ | 2.85 | 1.51680 | 64.20 |
| 27 | ∞ | 2.53 | | |

TABLE 10

EXAMPLE 3—SPECIFICATION (d-LINE)

| | WIDE ANGLE | MIDDLE | TELEPHOTO |
|---|---|---|---|
| ZOOM RATIO | 1.0 | 1.7 | 2.9 |
| f | 17.51 | 29.71 | 50.43 |
| FNo. | 2.90 | 3.58 | 4.33 |
| 2ω[°] | 83.4 | 50.4 | 30.4 |

TABLE 11

EXAMPLE 3—ZOOM DISTANCE

| | WIDE ANGLE | MIDDLE | TELEPHOTO |
|---|---|---|---|
| DD[3] | 0.60 | 12.50 | 25.31 |
| DD[9] | 14.22 | 6.85 | 1.55 |
| DD[18] | 3.80 | 1.94 | 1.64 |
| DD[23] | 3.30 | 12.80 | 22.92 |

TABLE 12

EXAMPLE 3—ASPHERIC SURFACE COEFFICIENT

| SURFACE NUMBER | 6 | 7 | 11 |
|---|---|---|---|
| KA | 1.0000000E+00 | 1.0000000E+00 | 1.0000000E+00 |
| A3 | 3.1558736E−04 | −2.7557470E−05 | 7.2185172E−05 |
| A4 | −4.6704250E−04 | −2.9070641E−04 | −9.6569219E−05 |
| A5 | 9.9317849E−05 | 4.6031344E−05 | 4.7203097E−05 |
| A6 | −9.2502292E−06 | −1.3409583E−06 | −7.4622450E−06 |
| A7 | −1.0848628E−07 | −6.0235913E−07 | −1.9840543E−06 |
| A8 | 4.0964810E−08 | 4.5962035E−09 | 8.8881308E−07 |
| A9 | 2.8247202E−09 | 7.4724056E−09 | −9.8765405E−08 |
| A10 | −3.1970234E−11 | 5.7903817E−10 | 3.5023946E−09 |
| A11 | −1.5066077E−11 | −1.8532085E−11 | −9.8501298E−10 |
| A12 | −1.6675777E−12 | −9.4180465E−12 | −3.1131414E−12 |
| A13 | −6.2441127E−14 | −1.0567126E−12 | 2.4900325E−11 |
| A14 | −3.9399549E−15 | −1.2568924E−14 | 3.5380198E−12 |
| A15 | −3.8066178E−16 | 9.9189344E−15 | −2.5044904E−13 |
| A16 | 1.3843763E−17 | 1.6916768E−15 | −5.0462625E−14 |
| A17 | −1.0673607E−17 | 8.2930896E−17 | −1.1694978E−14 |

TABLE 12-continued

EXAMPLE 3—ASPHERIC SURFACE COEFFICIENT

| A18 | 4.7120238E-18 | -1.5311859E-17 | -4.3852946E-16 |
| A19 | 4.1399422E-19 | -2.4938147E-18 | 4.5807825E-16 |
| A20 | -6.0649421E-20 | 1.9236998E-19 | -2.4150453E-17 |

| SURFACE NUMBER | 12 | 19 | 20 |
|---|---|---|---|
| KA | 1.0000000E+00 | 1.0000000E+00 | 1.0000000E+00 |
| A3 | 1.7271343E-04 | 1.0027595E-04 | 7.6435554E-05 |
| A4 | -2.3802858E-05 | -1.1493698E-04 | -2.4226964E-05 |
| A5 | -3.0352871E-05 | 4.1627367E-05 | 1.3100910E-05 |
| A6 | 2.7147506E-05 | -7.0773961E-06 | -3.2252917E-06 |
| A7 | -6.0822822E-06 | 5.7547011E-07 | 1.0453779E-06 |
| A8 | 2.2858819E-07 | -7.7540549E-08 | -1.8544265E-07 |
| A9 | -1.7458213E-09 | 2.4349107E-08 | 7.6826704E-09 |
| A10 | 2.1243643E-08 | -2.5142920E-09 | 7.0657226E-10 |
| A11 | -3.8251261E-10 | 3.1898242E-11 | 3.0988570E-10 |
| A12 | -5.1671466E-10 | -2.5484162E-11 | -4.8593675E-11 |
| A13 | -7.7813389E-11 | 5.8414116E-12 | -2.5083731E-12 |
| A14 | 7.4423410E-12 | -9.3639330E-14 | -2.2276873E-13 |
| A15 | 6.1476856E-12 | -3.9077266E-14 | 1.8416565E-13 |
| A16 | -8.0024188E-13 | 2.1837550E-15 | -1.3141527E-14 |
| A17 | -1.2819270E-14 | 1.6122368E-17 | -8.3988939E-17 |
| A18 | -1.4374357E-15 | -6.6941192E-19 | 5.2053693E-18 |
| A19 | 1.2717259E-15 | -8.8299736E-19 | 1.2975583E-18 |
| A20 | -7.7197940E-17 | 5.9204723E-20 | -4.6653616E-21 |

Figure 4:
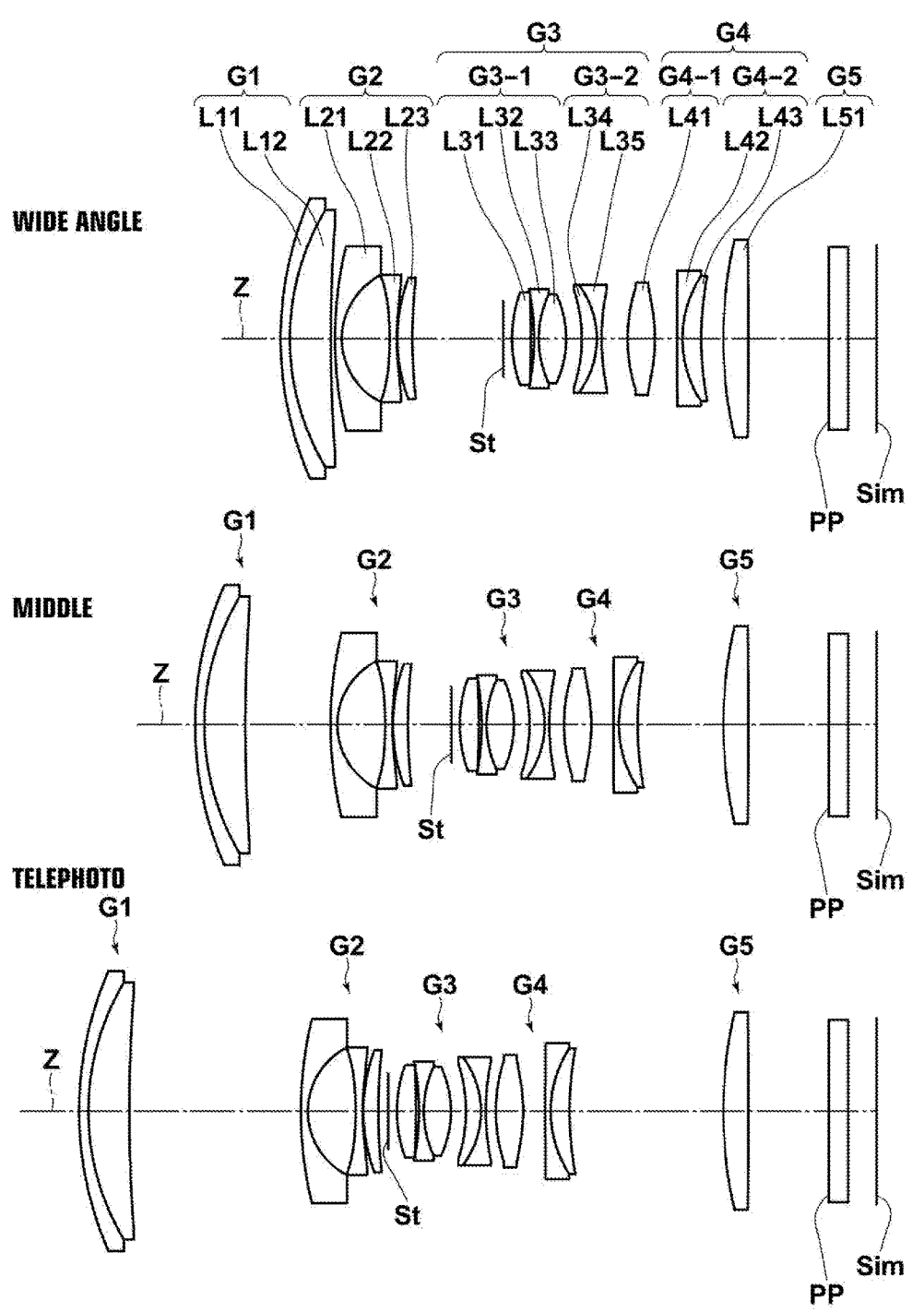
FIG. 4 is a cross section illustrating the lens configuration of a zoom lens in Example 4 of the present invention.

Next, a zoom lens in Example 4 will be described. FIG. 4 is a cross section illustrating the lens configuration of the zoom lens in Example 4.

The shape of the zoom lens in Example 4 is also similar to that of the zoom lens in Example 1.

Table 13 shows basic lens data of the zoom lens in Example 4. Table 14 shows data about the specification of the zoom lens in Example 4. Table 15 shows data about moving surface distances. Table 16 shows data about aspheric surface coefficients. FIG. 9, Sections A through L illustrate aberration diagrams.

TABLE 13

EXAMPLE 4—LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 54.8895 | 1.35 | 1.92286 | 18.90 |
| 2 | 39.2609 | 6.01 | 1.80400 | 46.58 |
| 3 | 256.7253 | DD[3] | | |
| 4 | 61.4620 | 1.00 | 1.69680 | 55.53 |
| 5 | 11.0289 | 7.00 | | |
| *6 | -75.0344 | 1.05 | 1.67790 | 54.89 |
| *7 | 32.1704 | 0.10 | | |
| 8 | 27.1051 | 2.20 | 1.92286 | 18.90 |
| 9 | 85.4713 | DD[9] | | |
| 10(STOP) | ∞ | 1.30 | | |
| *11 | 20.8701 | 2.80 | 1.80610 | 40.73 |
| *12 | -93.1175 | 0.43 | | |
| 13 | -38.4263 | 0.70 | 1.64769 | 33.79 |
| 14 | 16.3959 | 4.01 | 1.49700 | 81.54 |
| 15 | -16.3959 | 2.30 | | |
| 16 | -23.9450 | 2.20 | 2.00100 | 29.13 |
| 17 | -13.9403 | 0.71 | 1.62588 | 35.70 |
| 18 | 38.7865 | DD[18] | | |
| *19 | 25.7224 | 4.00 | 1.58313 | 59.38 |
| *20 | -27.8710 | 3.24 | | |
| 21 | 1316.0826 | 0.80 | 1.76200 | 40.10 |
| 22 | 17.9998 | 2.76 | 1.51680 | 64.20 |
| 23 | 52.5002 | DD[23] | | |

TABLE 13-continued

EXAMPLE 4—LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 24 | 68.0585 | 3.70 | 1.75500 | 52.32 |
| 25 | -1197.8554 | 11.77 | | |
| 26 | ∞ | 2.85 | 1.51680 | 64.20 |
| 27 | ∞ | 4.17 | | |

TABLE 14

EXAMPLE 4—SPECIFICATION (d-LINE)

| | WIDE ANGLE | MIDDLE | TELEPHOTO |
|---|---|---|---|
| ZOOM RATIO | 1.0 | 1.7 | 2.9 |
| f | 17.69 | 30.02 | 50.95 |
| FNo. | 2.89 | 3.56 | 4.28 |
| 2ω[°] | 83.0 | 50.0 | 30.0 |

TABLE 15

EXAMPLE 4—ZOOM DISTANCE

| | WIDE ANGLE | MIDDLE | TELEPHOTO |
|---|---|---|---|
| DD[3] | 0.60 | 12.50 | 25.24 |
| DD[9] | 13.43 | 6.41 | 1.43 |
| DD[18] | 3.80 | 2.14 | 1.47 |
| DD[23] | 3.30 | 12.63 | 22.62 |

TABLE 16

EXAMPLE 4—ASPHERIC SURFACE COEFFICIENT

| SURFACE NUMBER | 6 | 7 | 11 |
|---|---|---|---|
| KA | 1.0000000E+00 | 1.0000000E+00 | 1.0000000E+00 |
| A3 | 2.4640831E−04 | −8.4820224E−05 | 6.9504947E−05 |
| A4 | −4.6532459E−04 | −2.8716105E−04 | −1.0476109E−04 |
| A5 | 9.9801790E−05 | 4.7095520E−05 | 4.7950421E−05 |
| A6 | −9.2259237E−06 | −1.3199481E−06 | −7.4600493E−06 |
| A7 | −1.0835540E−07 | −6.0159357E−07 | −1.9842266E−06 |
| A8 | 4.0957254E−08 | 4.6193052E−09 | 8.8880919E−07 |
| A9 | 2.8244812E−09 | 7.4729236E−09 | −9.8765457E−08 |
| A10 | −3.1974131E−11 | 5.7904755E−10 | 3.5023940E−09 |
| A11 | −1.5066109E−11 | −1.8531924E−11 | −9.8501298E−10 |
| A12 | −1.6675773E−12 | −9.4180441E−12 | −3.1131414E−12 |
| A13 | −6.2441104E−14 | −1.0567125E−12 | 2.4900325E−11 |
| A14 | −3.9399543E−15 | −1.2568923E−14 | 3.5380198E−12 |
| A15 | −3.8066176E−16 | 9.9189344E−15 | −2.5044904E−13 |
| A16 | 1.3843763E−17 | 1.6916768E−15 | −5.0462625E−14 |
| A17 | −1.0673607E−17 | 8.2930896E−17 | −1.1694978E−14 |
| A18 | 4.7120238E−18 | −1.5311859E−17 | −4.3852946E−16 |
| A19 | 4.1399422E−19 | −2.4938147E−18 | 4.5807825E−16 |
| A20 | −6.0649421E−20 | 1.9236998E−19 | −2.4150453E−17 |

| SURFACE NUMBER | 12 | 19 | 20 |
|---|---|---|---|
| KA | 1.0000000E+00 | 1.0000000E+00 | 1.0000000E+00 |
| A3 | 1.8068877E−04 | 6.5171501E−05 | 4.9482744E−05 |
| A4 | −3.5228243E−05 | −1.1602404E−04 | −1.7778935E−05 |
| A5 | −2.9155959E−05 | 4.0525780E−05 | 1.2331045E−05 |
| A6 | 2.7174731E−05 | −7.0553306E−06 | −3.1868741E−06 |
| A7 | −6.0818261E−06 | 5.7849615E−07 | 1.0458084E−06 |
| A8 | 2.2859437E−07 | −7.7431370E−08 | −1.8546318E−07 |
| A9 | −1.7457549E−09 | 2.4351767E−08 | 7.6816669E−09 |
| A10 | 2.1243644E−08 | −2.5142394E−09 | 7.0654506E−10 |
| A11 | −3.8251262E−10 | 3.1899155E−11 | 3.0988512E−10 |
| A12 | −5.1671466E−10 | −2.5484147E−11 | −4.8593685E−11 |
| A13 | −7.7813389E−11 | 5.8414118E−12 | −2.5083733E−12 |
| A14 | 7.4423410E−12 | −9.3639327E−14 | −2.2276873E−13 |
| A15 | 6.1476856E−12 | −3.9077266E−14 | 1.8416565E−13 |
| A16 | −8.0024188E−13 | 2.1837550E−15 | −1.3141527E−14 |
| A17 | −1.2819270E−14 | 1.6122368E−17 | −8.3988939E−17 |
| A18 | −1.4374357E−15 | −6.6941192E−19 | 5.2053693E−18 |
| A19 | 1.2717259E−15 | −8.8299736E−19 | 1.2975583E−18 |
| A20 | −7.7197940E−17 | 5.9204723E−20 | −4.6653616E−21 |

Figure 5:
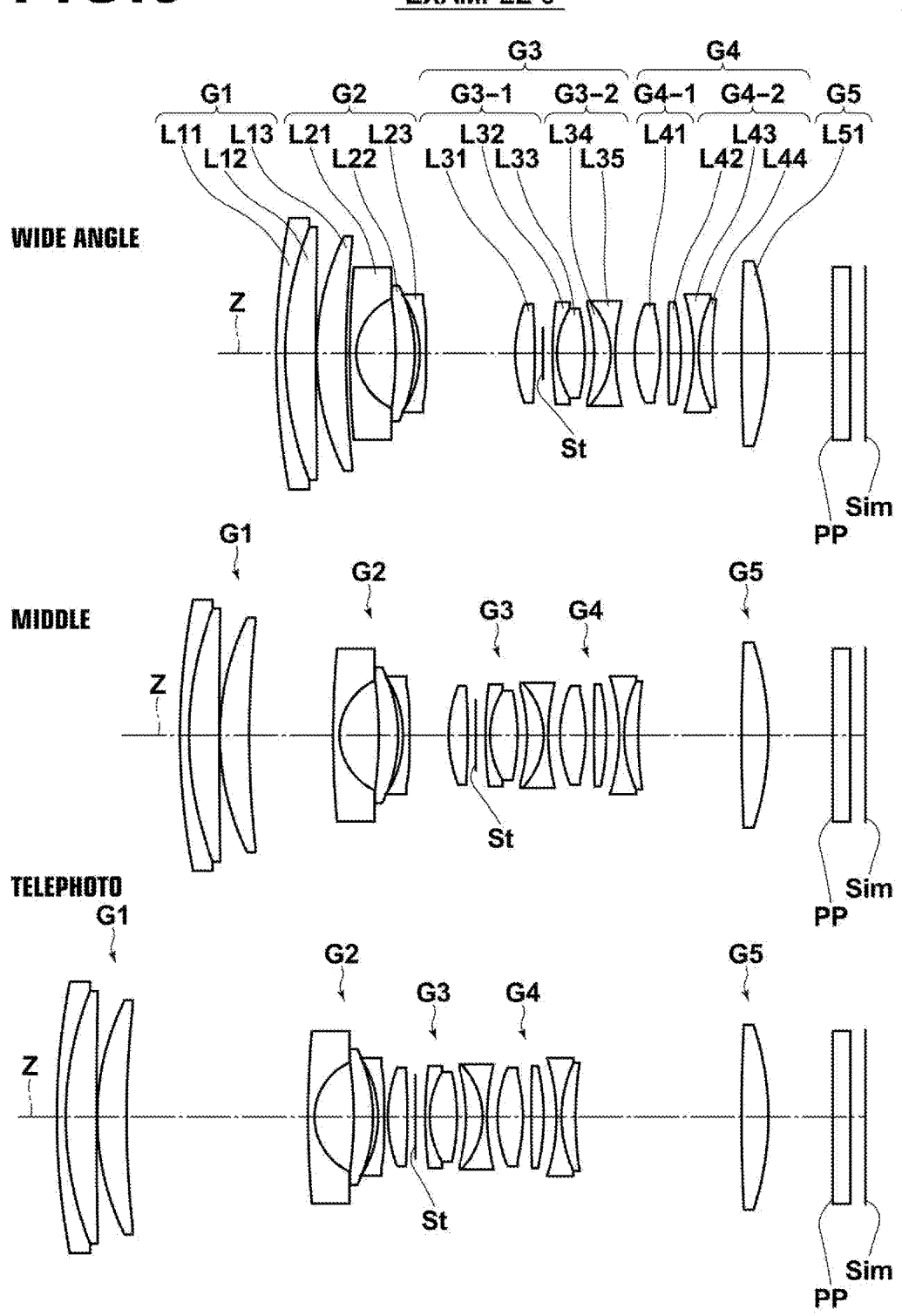
FIG. 5 is a cross section illustrating the lens configuration of a zoom lens in Example 5 of the present invention.

Next, a zoom lens in Example 5 will be described. FIG. 5 is a cross section illustrating the lens configuration of the zoom lens in Example 5.

In the zoom lens of Example 5, importance is given to FNo. at a telephoto end while FNo. is kept approximately constant from a wide angle end through a telephoto end. Each of first lens group G1 and 4-2nd lens group G4-2 consists of two positive lenses and a negative lens to make FNo. at a telephoto end small.

Table 17 shows basic lens data of the zoom lens in Example 5. Table 18 shows data about the specification of the zoom lens in Example 5. Table 19 shows data about moving surface distances. Table 20 shows data about aspheric surface coefficients. FIG. 10, Sections A through L illustrate aberration diagrams.

TABLE 17

EXAMPLE 5—LENS DATA

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 1 | 120.0020 | 1.40 | 1.80518 | 25.42 |
| 2 | 57.4681 | 4.83 | 1.59282 | 68.63 |
| 3 | 1184.8754 | 0.10 | | |
| 4 | 44.3641 | 4.60 | 1.58913 | 61.14 |
| 5 | 170.0285 | DD[5] | | |
| 6 | 160.0009 | 1.00 | 1.58913 | 61.14 |
| 7 | 9.9168 | 6.15 | | |
| 8 | −66.9937 | 3.02 | 1.92286 | 18.90 |
| 9 | −25.7444 | 0.79 | | |
| *10 | −20.2658 | 1.00 | 1.56864 | 58.62 |
| *11 | −214748.3648 | DD[11] | | |
| *12 | 21.1524 | 3.06 | 1.80348 | 40.44 |
| *13 | −139.1290 | 1.28 | | |
| 14(STOP) | ∞ | 1.52 | | |
| 15 | 68.2427 | 0.70 | 1.84666 | 23.78 |
| 16 | 14.2671 | 4.31 | 1.49700 | 81.54 |
| 17 | −33.6981 | 1.50 | | |
| 18 | −28.1484 | 2.60 | 1.88300 | 40.76 |
| 19 | −12.5000 | 0.71 | 1.67003 | 47.23 |
| 20 | 35.0769 | DD[20] | | |
| *21 | 19.9280 | 4.00 | 1.58878 | 60.39 |
| *22 | −27.0316 | 1.30 | | |
| 23 | 320.3039 | 1.95 | 1.84666 | 23.78 |

TABLE 17-continued

EXAMPLE 5—LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 24 | −38.6244 | 2.00 | | |
| 25 | −32.0000 | 0.80 | 1.90366 | 31.32 |
| 26 | 21.5896 | 2.19 | 1.51823 | 58.90 |
| 27 | 59.9996 | DD[27] | | |
| 28 | 313.1746 | 4.20 | 1.59551 | 39.24 |
| 29 | −49.6781 | 10.09 | | |
| 30 | ∞ | 2.74 | 1.51680 | 64.20 |
| 31 | ∞ | 2.39 | | |

TABLE 18

EXAMPLE 5—SPECIFICATION (d-LINE)

| | WIDE ANGLE | MIDDLE | TELEPHOTO |
|---|---|---|---|
| ZOOM RATIO | 1.0 | 1.9 | 3.8 |
| f | 18.55 | 36.02 | 69.93 |
| FNo. | 4.12 | 4.03 | 4.12 |
| 2ω[°] | 79.0 | 42.0 | 22.2 |

TABLE 19

EXAMPLE 5—ZOOM DISTANCE

| | WIDE ANGLE | MIDDLE | TELEPHOTO |
|---|---|---|---|
| DD[5] | 0.60 | 13.14 | 28.51 |
| DD[11] | 14.07 | 6.19 | 0.53 |
| DD[20] | 3.03 | 1.86 | 1.62 |
| DD[27] | 4.60 | 16.28 | 26.10 |

TABLE 20

EXAMPLE 5—ASPHERIC SURFACE COEFFICIENT

| SURFACE NUMBER | 10 | 11 | 12 |
|---|---|---|---|
| KA | 1.0000000E+00 | 1.0000000E+00 | 1.0000000E+00 |
| A3 | 1.4710075E−05 | −1.1114564E−04 | −9.4875773E−05 |
| A4 | −1.3498184E−04 | −1.1366697E−04 | 5.1924971E−05 |
| A5 | 1.3438801E−05 | −4.4589338E−06 | −3.1196469E−05 |
| A6 | 9.7069336E−07 | 1.7492668E−06 | 4.7394919E−06 |
| A7 | −1.2406292E−07 | 1'.1878640E−07 | −1.1496661E−07 |
| A8 | −1.3654689E−08 | −2.3417949E−08 | −2.5103116E−08 |
| A9 | −6.0236316E−10 | −3.7970117E−09 | −2.3399759E−11 |
| A10 | 1.3005314E−10 | −1.9981254E−10 | 2.5128108E−11 |
| A11 | 1.9637142E−11 | 2.9609297E−11 | −1.1959222E−11 |
| A12 | 3.9898990E−13 | 7.5049089E−12 | −3.0879054E−12 |
| A13 | −6.5490150E−14 | 9.0490108E−13 | 8.3623686E−14 |
| A14 | −1.1108947E−14 | 7.9172969E−15 | 3.3466610E−13 |
| A15 | −5.1698402E−16 | −9.6655332E−15 | 6.9535430E−14 |
| A16 | −2.2199076E−17 | −2.1687865E−15 | −1.2848482E−14 |
| A17 | −4.3913057E−18 | −2.9117675E−16 | −2.1563437E−15 |
| A18 | 6.0740665E−19 | 1.5511221E−17 | 1.6030243E−16 |
| A19 | −3.0641343E−20 | 1.0485636E−17 | 4.1523170E−17 |
| A20 | 6.3406416E−21 | −7.5517963E−19 | −3.3766752E−18 |

| SURFACE NUMBER | 13 | 21 | 22 |
|---|---|---|---|
| KA | 1.0000000E+00 | 1.0000000E+00 | 1.0000000E+00 |
| A3 | 4.4936294E−05 | −3.2883606E−05 | −8.1798183E−05 |
| A4 | −2.9371649E−05 | −4.4049557E−06 | 7.3383463E−05 |
| A5 | 5.8126557E−06 | −1.5559073E−05 | −1.3060843E−05 |
| A6 | −2.2578652E−06 | 2.9024781E−06 | 8.1543535E−07 |
| A7 | 4.3550700E−07 | 5.9206699E−08 | 2.0655608E−07 |
| A8 | 8.5709734E−09 | −3.4831431E−08 | −3.2275316E−09 |
| A9 | −6.8459296E−09 | −3.2907607E−09 | −2.7086652E−09 |
| A10 | −6.3071536E−10 | 8.2929241E−11 | −2.0701530E−10 |
| A11 | 5.7644120E−11 | 6.5189665E−11 | −3.4213228E−12 |
| A12 | 1.8819047E−11 | 9.8556008E−12 | 3.0124821E−12 |
| A13 | 5.9125365E−15 | 3.5053765E−13 | 5.3137102E−13 |
| A14 | 7.9830822E−14 | −7.6467347E−14 | 4.4083185E−14 |
| A15 | −3.0161786E−15 | −2.5191542E−14 | 2.5223817E−15 |
| A16 | −1.8327240E−14 | −3.1447835E−15 | −4.8712413E−16 |
| A17 | 3.4489108E−15 | −1.4562674E−17 | −8.4681622E−17 |
| A18 | −4.7573986E−16 | 6.6016285E−17 | −2.3898964E−17 |
| A19 | 5.6414830E−17 | 1.2055678E−17 | −1.2751260E−19 |
| A20 | −2.7329650E−18 | −1.4449480E−18 | 3.4990196E−19 |

Table 21 shows values corresponding to conditional expressions (3) through (9) for the zoom lenses in Examples 1 through 5. In all of the examples, d-line is a reference wavelength. The following Table 21 shows values at this reference wavelength.

TABLE 21

| EXPRESSION NUMBER | CONDITIONAL EXPRESSION | EXAMPLE 1 | EXAMPLE 2 | EXAMPLE 3 | EXAMPLE 4 | EXAMPLE 5 |
|---|---|---|---|---|---|---|
| (3) | f1/fw | 4.60 | 5.71 | 5.33 | 5.20 | 4.36 |
| (4) | f1/ft | 1.60 | 1.98 | 1.85 | 1.81 | 1.16 |
| (5) | f3−2/fw | −1.66 | −1.84 | −2.45 | −1.85 | −1.60 |
| (6) | f3−2/ft | −0.58 | −0.64 | −0.85 | −0.64 | −0.43 |
| (7) | f4−2/fw | −1.54 | −1.54 | −1.55 | −2.45 | −1.95 |
| (8) | f4−2/ft | −0.54 | −0.53 | −0.54 | −0.85 | −0.52 |
| (9) | (R1f + R1r)/(R1f − R1r) | −1.65 | −2.40 | −1.68 | −1.54 | — |

As these data show, all of the zoom lenses in Examples 1 through 5 satisfy conditional expressions (1) through (8). Further, all of the zoom lenses in Examples 1 through 4 corresponding to conditional expression (9) satisfy conditional expression (9). It is recognizable that the zoom lenses have small FNo., and various aberrations are excellently corrected, and the total lengths of the zoom lenses are short, and a full angle of view at a wide angle end is wide while the zoom lenses have hand shake blur correction functions.

Figure 11:
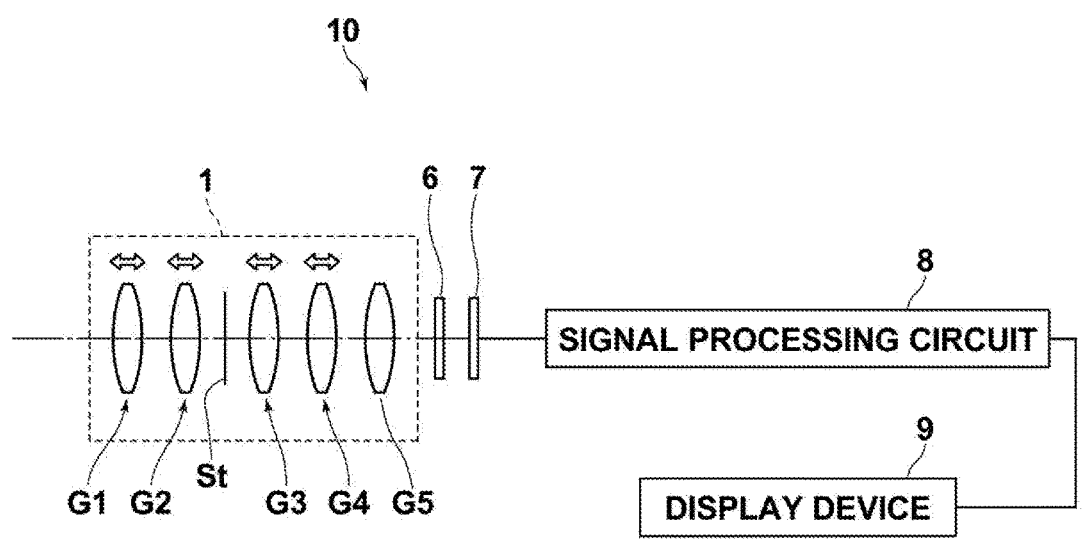
FIG. 11 is a schematic diagram illustrating the configuration of an imaging apparatus according to an embodiment of the present invention.

Next, an imaging apparatus according to an embodiment of the present invention will be described. FIG. 11 is a schematic diagram illustrating the configuration of an imaging apparatus using a zoom lens according to an embodiment of the present invention, as an example of an imaging apparatus according to an embodiment of the present invention. In FIG. 11, each lens group is schematically illustrated. This imaging apparatus is, for example, a video camera, an electronic still camera or the like using a solid state imaging device, such as a CCD and a CMOS, as a recording medium.

An imaging apparatus 10 illustrated in FIG. 11 includes a zoom lens 1, a filter 6 having a function of a low-pass filter or the like, and which is arranged toward the image side of the zoom lens 1, an imaging device 7 arranged toward the image side of the filter 6, and a signal processing circuit 8. The imaging device 7 converts an optical image formed by the zoom lens 1 into electrical signals. For example, a CCD (Charge Coupled Device), a CMOS (Complementary Metal Oxide Semiconductor) or the like may be used as the imaging device 7. The imaging device 7 is arranged in such a manner that an imaging surface of the imaging device 7 is matched with the image plane of the zoom lens 1.

An image imaged by the zoom lens 1 is formed on the imaging surface of the imaging device 7, and signals about the image are output from the imaging device 7. Operation processing is performed on the output signals at a signal processing circuit 8, and an image is displayed on a display device 9.

The present invention has been described by using embodiments and examples. However, the present invention is not limited to the aforementioned embodiments and examples, and various modifications are possible. For example, the values of a curvature radius, a distance between surfaces, a refractive index, an Abbe number and the like of each lens element are not limited to the values in the aforementioned numerical value examples, and may be other values.

What is claimed is:

1. A zoom lens consisting of:
a first lens group having positive refractive power;
a second lens group having negative refractive power;
a third lens group having positive refractive power;
a fourth lens group having positive refractive power; and
a fifth lens group having positive refractive power in this order from an object side,
wherein the third lens group consists of a 3-1st lens group having positive refractive power and a 3-2nd lens group having negative refractive power in this order from the object side, and
wherein the 3-1st lens group consists of a positive lens, a negative lens and a positive lens in this order from the object side, and
wherein a hand shake blur is corrected by moving the 3-2nd lens group in a direction perpendicular to an optical axis, and
wherein magnification is changed by changing distances between the lens groups while the fifth lens group is fixed, and
wherein the fourth lens group consists of a 4-1st lens group having positive refractive power and 4-2nd lens group having negative refractive power in this order from the object side, and
wherein focusing is performed by moving the 4-2nd lens group in an optical axis direction.

2. The zoom lens, as defined in claim 1, wherein the 4-2nd lens group includes a cemented lens of a negative lens with its concave surface facing an image side and a positive lens cemented together in this order from the object side.

3. The zoom lens, as defined in claim 1,
wherein the following conditional expressions are satisfied:

$$4.0 < f1/fw < 6.0 \qquad (3); \text{ and}$$

$$1.1 < f1/ft < 2.2 \qquad (4), \text{ where}$$

f1: a focal length of the first lens group,
fw: a focal length of the zoom lens an at the wide angle end, and
ft: a focal length of the zoom lens at a telephoto end.

4. The zoom lens, as defined in claim 1,
wherein the following conditional expressions are satisfied:

$$-3.0 < f3-2/fw < -1.0 \qquad (5); \text{ and}$$

$$-1.2 < f3-2/ft < -0.3 \qquad (6), \text{ where}$$

f3-2: a focal length of the 3-2nd lens group,
fw: a focal length of the zoom lens at a wide angle end, and
ft: a focal length of the zoom lens at a telephoto end.

5. The zoom lens, as defined in claim 1,
wherein the following conditional expressions are satisfied:

$$-3.0<f4\text{-}2/fw<-1.0 \quad (7); \text{ and}$$

$$-1.2<f4\text{-}2/ft<-0.3 \quad (8), \text{ where}$$

f4-2: a focal length of the 4-2nd lens group,
fw: a focal length of the zoom lens at a wide angle end, and
ft: a focal length of the zoom lens at a telephoto end.

6. The zoom lens, as defined in claim 1, wherein the first lens group consists of a negative lens with its concave surface facing an image side and a positive lens with its convex surface facing the object side in this order from the object side, and
wherein the following conditional expression is satisfied:

$$-3.0<(R1f+R1r)/(R1f-R1r)<-1.1 \quad (9), \text{ where}$$

R1f: a curvature radius of an object-side surface of the negative lens in the first lens group, and
R1r: a curvature radius of an image-side surface of the positive lens in the first lens group.

7. The zoom lens, as defined in claim 6, wherein the negative lens and the positive lens in the first lens group are cemented together.

8. The zoom lens, as defined in claim 1, wherein a stop is provided toward an object side of the third lens group.

9. The zoom lens, as defined in claim 1,
wherein the following conditional expressions are satisfied:

$$4.2<f1/fw<5.8 \quad (3\text{-}1); \text{ and}$$

$$1.4<f1/ft<2.1 \quad (4\text{-}1), \text{ where}$$

f1: a focal length of the first lens group,
fw: a focal length of the zoom lens at the wide angle end, and
ft: a focal length of the zoom lens at a telephoto end.

10. The zoom lens, as defined in claim 1,
wherein the following conditional expressions are satisfied:

$$-2.7<f3\text{-}2/fw<-1.3 \quad (5\text{-}1); \text{ and}$$

$$-1.0<f3\text{-}2/ft<-0.4 \quad (6\text{-}1), \text{ where}$$

f3-2: a focal length of the 3-2nd lens group,
fw: a focal length of the zoom lens at a wide angle end, and
ft: a focal length of the zoom lens at a telephoto end.

11. The zoom lens, as defined in claim 1,
wherein the following conditional expressions are satisfied:

$$-2.7<f4\text{-}2/fw<-1.3 \quad (7\text{-}1); \text{ and}$$

$$-1.0<f4\text{-}2/ft<-0.4 \quad (8\text{-}1), \text{ where}$$

f4-2: a focal length of the 4-2nd lens group,
fw: a focal length of the zoom lens at a wide angle end, and
ft: a focal length of the zoom lens at a telephoto end.

12. The zoom lens, as defined in claim 1, wherein the first lens group consists of a negative lens with its concave surface facing an image side and a positive lens with its convex surface facing the object side in this order from the object side, and
wherein the following conditional expression is satisfied:

$$-2.7<(R1f+R1r)/(R1f-R1r)<-1.3 \quad (9\text{-}1), \text{ where}$$

R1f: a curvature radius of an object-side surface of the negative lens in the first lens group, and
R1r: a curvature radius of an image-side surface of the positive lens in the first lens group.

13. An imaging apparatus comprising:
the zoom lens, as defined in claim 1.

14. A zoom lens consisting of:
a first lens group having positive refractive power;
a second lens group having negative refractive power;
a third lens group having positive refractive power;
a fourth lens group having positive refractive power; and
a fifth lens group having positive refractive power in this order from an object side,
wherein the third lens group consists of a 3-1st lens group having positive refractive power and a 3-2nd lens group having negative refractive power in this order from the object side, and
wherein the 3-2nd lens group consists of a cemented lens of a positive lens with its convex surface facing an image side and a negative lens cemented together in this order from the object side, and
wherein the 3-2nd lens group satisfies the following conditional expressions, and
wherein a hand shake blur is corrected by moving the 3-2nd lens group in a direction perpendicular to an optical axis, and
wherein magnification is changed by changing distances between the lens groups while the fifth lens group is fixed:

$$Np>Nn \quad (1); \text{ and}$$

$$\nu p<\nu n \quad (2), \text{ where}$$

Np: a refractive index of the positive lens constituting the 3-2nd lens group,
Nn: a refractive index of the negative lens constituting the 3-2nd lens group,
νp: an Abbe number of the positive lens constituting the 3-2nd lens group, and
νn: an Abbe number of the negative lens constituting the 3-2nd lens group.

15. The zoom lens, as defined in claim 14, wherein the fourth lens group consists of a 4-1st lens group having positive refractive power and 4-2nd lens group having negative refractive power in this order from the object side, and
wherein focusing is performed by moving the 4-2nd lens group in an optical axis direction.

16. The zoom lens, as defined in claim 15, wherein the 4-2nd lens group includes a cemented lens of a negative lens with its concave surface facing an image side and a positive lens cemented together in this order from the object side.

17. The zoom lens, as defined in claim 14,
wherein the following conditional expressions are satisfied:

$$4.0<f1/fw<6.0 \quad (3); \text{ and}$$

$$1.1<f1/ft<2.2 \quad (4), \text{ where}$$

f1: a focal length of the first lens group,
fw: a focal length of the zoom lens at the wide angle end, and
ft: a focal length of the zoom lens at a telephoto end.

18. The zoom lens, as defined in claim 14, wherein the following conditional expressions are satisfied:

$$-3.0 < f3\text{-}2/fw < -1.0 \quad (5); \text{ and}$$

$$-1.2 < f3\text{-}2/ft < -0.3 \quad (6), \text{ where}$$

f3-2: a focal length of the 3-2nd lens group,
fw: a focal length of the zoom lens at a wide angle end, and
ft: a focal length of the zoom lens at a telephoto end.

19. An imaging apparatus comprising:
the zoom lens, as defined in claim 14.

\* \* \* \* \*